US010679046B1

(12) United States Patent
Black et al.

(10) Patent No.: US 10,679,046 B1
(45) Date of Patent: Jun. 9, 2020

(54) MACHINE LEARNING SYSTEMS AND METHODS OF ESTIMATING BODY SHAPE FROM IMAGES

(71) Applicant: Max-Planck-Gesellschaft zur Förderung der Wissenschaften e.V., Munich (DE)

(72) Inventors: Michael Black, Tuebingen (DE); Eric Rachlin, Brooklyn, NY (US); Nicolas Heron, New York, NY (US); Matthew Loper, San Francisco, CA (US); Alexander Weiss, Boston, MA (US); Xiaochen Hu, New York, NY (US); Theodora Hinkle, Brooklyn, NY (US); Martin Kristiansen, New York, NY (US)

(73) Assignee: Max-Planck-Gesellschaft zur Förderung der Wissenschaften e.V., Munich (DE)

( * ) Notice: Subject to any disclaimer, the term of this patent is extended or adjusted under 35 U.S.C. 154(b) by 127 days.

(21) Appl. No.: 15/826,503

(22) Filed: Nov. 29, 2017

Related U.S. Application Data

(60) Provisional application No. 62/427,579, filed on Nov. 29, 2016.

(51) Int. Cl.
*G06K 9/00* (2006.01)
*G06T 7/50* (2017.01)
*G06N 3/08* (2006.01)

(52) U.S. Cl.
CPC ..... *G06K 9/00369* (2013.01); *G06K 9/00979* (2013.01); *G06N 3/084* (2013.01);
(Continued)

(58) Field of Classification Search
CPC .......... G06K 9/00362; G06K 9/00288; G06K 9/00369; G06K 2209/21; G06K 9/00147;
(Continued)

(56) References Cited

U.S. PATENT DOCUMENTS

2010/0111370 A1  5/2010  Black et al.
2018/0007382 A1*  1/2018  Pio ........................ H04N 19/52
(Continued)

FOREIGN PATENT DOCUMENTS

WO   WO-2017029488 A2 *  2/2017  ............. G06T 15/04

OTHER PUBLICATIONS

Bogo, et al., Detailed Full-Body Reconstructions of Moving People from Monocular RGB-D Sequences. In International Conference on Computer Vision (ICCV), pp. 2300-2308, Dec. 2015.
Hill, et al., Creating body shapes from verbal descriptions by linking similarity spaces. Psychological Science, to appear, 2016.
Loper, et al, SMPL: A Skinned Multi-Person Linear Model. ACM Trans. Graphics (Proc. SIGGRAPH Asia), 34(6):248:1-248:16, ACM, New York, NY, Oct. 2015.
(Continued)

*Primary Examiner* — Kenny A Cese
(74) *Attorney, Agent, or Firm* — Knobbe Martens Olson & Bear LLP

(57) ABSTRACT

Disclosed is a method including receiving an input image including a human, predicting, based on a convolutional neural network that is trained using examples consisting of pairs of sensor data, a corresponding body shape of the human and utilizing the corresponding body shape predicted from the convolutional neural network as input to another convolutional neural network to predict additional body shape metrics.

18 Claims, 12 Drawing Sheets

(52) U.S. Cl.
CPC ...... *G06T 7/50* (2017.01); *G06T 2207/20081* (2013.01); *G06T 2207/20084* (2013.01); *G06T 2207/30196* (2013.01)

(58) Field of Classification Search
CPC ...... G06K 9/00979; G06T 2207/20084; G06T 2207/20081; G06T 2200/24; G06T 7/50; G06N 20/00; G06N 3/0454; G06N 3/084
See application file for complete search history.

(56) References Cited

U.S. PATENT DOCUMENTS

2018/0039745 A1* 2/2018 Chevalier .............. G16H 30/40
2019/0035149 A1* 1/2019 Chen .................. G06K 9/00248

OTHER PUBLICATIONS

Loper, et al, MoSH: Motion and Shape Capture from Sparse Markers, available online at http://files.is.tue.mpg.de/black/papers/MoSh.pdf; ACM Transactions on Graphics (TOG)—Proceedings of ACM SIGGRAPH Asia 2014 TOG, vol. 33 Issue 6, Nov. 2014.
Newell, et al, Stacked Hourglass Networks for Human Pose Estimation, arXiv:1603.06937v2 [cs.CV] Jul. 26, 2016.
Streuber, et al., Body Talk: Crowdshaping Realistic 3D Avatars with Words. ACM Trans. Graph. (Proc. SIGGRAPH), 35(4):54:1-54:14, Jul. 2016.
Weiss, et al., Home 3D body scans from noisy image and range data. In Int. Conf. on Computer Vision (ICCV), pp. 1951-1958, IEEE, Barcelona, Nov. 2011.

* cited by examiner

MACHINE LEARNING SYSTEMS AND METHODS OF ESTIMATING BODY SHAPE FROM IMAGES

BACKGROUND

Three-dimensional ("3D") models of the human body have become sophisticated and highly detailed, with the ability to accurately model human shapes and poses. Body shape is often captured using expensive scanning systems (e.g., laser, stereo, structured light) or commodity depth sensors, or extrapolated from sets of stereoscopic images.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1A:
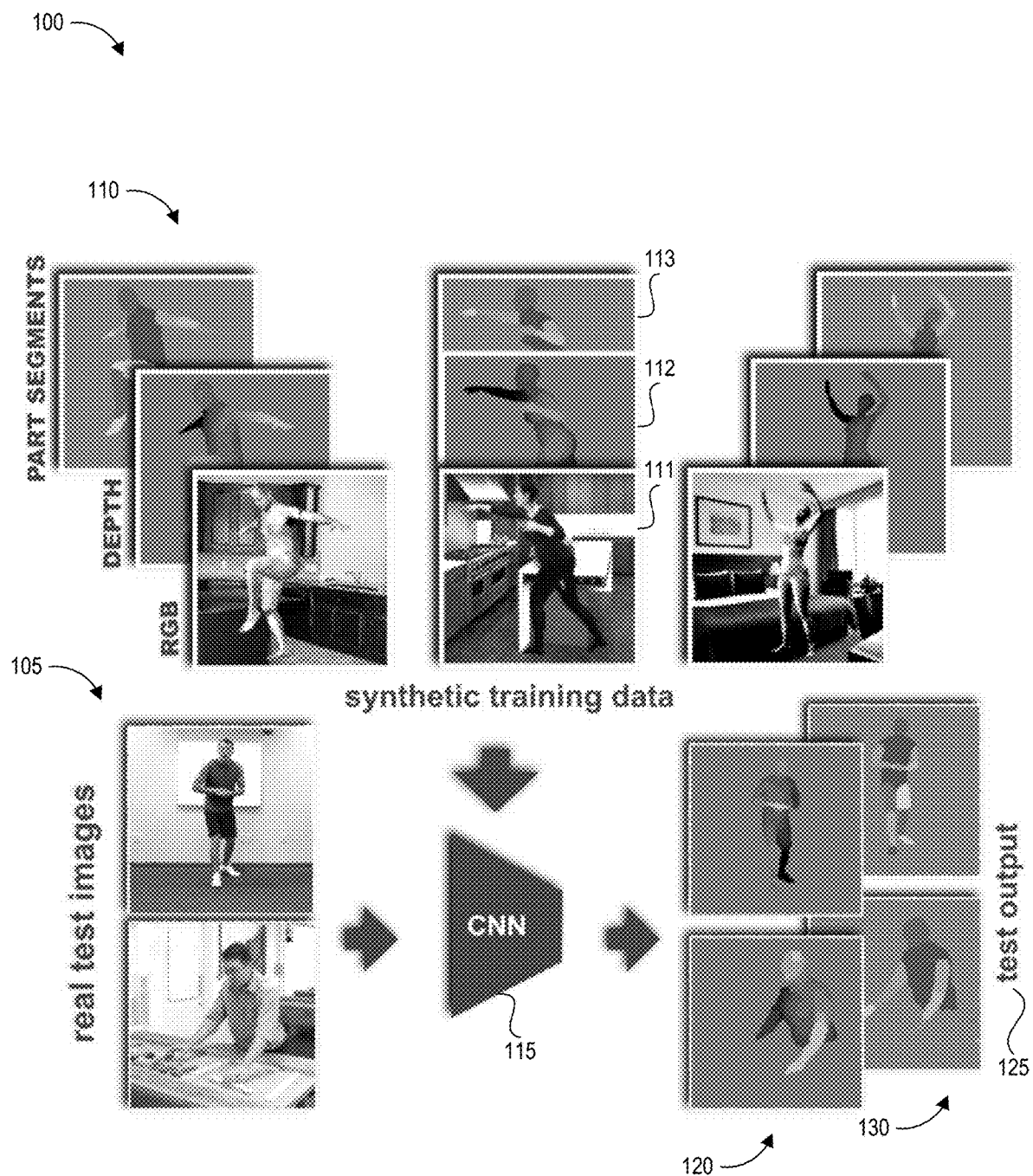
FIGS. 1A-1D depicts graphical examples of the disclosed machine learning systems that implement synthetic training data for predicting human body shape metrics.

The present disclosure is generally directed to using artificially intelligent machine learning systems to analyze images for identifying the body shape of depicted humans. For example, the disclosed machine learning system can include a first convolutional neural network trained to receive input image data depicting a human and predict a corresponding body shape of the human. The body shape predicted by the first convolutional neural network can be provided as input to another convolutional neural network trained to predict additional body shape metrics, for example, clothing size.

The estimation of three-dimensional ("3D") human body shape is important for many applications in the clothing industry, fitness, health, special effects, virtual reality, and video games to name a few. Body shape is often captured using expensive scanning systems (e.g., laser, stereo, structured light) or commodity depth sensors, or from sets of stereoscopic images. However, one drawback of such systems is their requirement for specialized optical devices to capture the data that is used for estimation of body shape. Further, although the output of such systems may be a 3D model of body shape, this model may lack contextual information about the body such as clothing on the body, lighting conditions, and occluded body parts. In addition, it can be difficult to acquire sufficient quantities of such data for training certain machine learning models such as convolutional neural networks ("CNNs").

The aforementioned problems, among others, are addressed in some embodiments by the disclosed artificially intelligent machine learning systems that predict body shape and other associated body shape metrics from input images. The disclosed technology can generate these predictions from image data, for example, from a digital camera, by leveraging a system of machine learning models that confer understanding of body shape and the clothing sizes or other body shape metrics associated with the identified body shape.

Estimating human pose, shape, and motion from images and videos are fundamental challenges with many applications. Recent advances in two-dimensional ("2D") human pose estimation use large amounts of manually-labeled training data for training CNNs. Such data is time consuming to acquire and difficult to extend. Moreover, manual labeling of 3D pose, depth and motion is often impractical. The present disclosure addresses this problem by generating and using a new data set for CNN training, referred to herein as Synthetic hUmans foR REAL tasks ("SURREAL"). SURREAL is a large-scale dataset with synthetically-generated, but realistic, images of humans rendered from 3D sequences of human motion capture data. In one example, the disclosed technique can generate more than 6 million frames together with ground truth pose, depth maps, and segmentation masks. Ground truth refers to an image segmentation provided by direct observation (e.g., empirical evidence) as opposed to an image segmentation provided by machine learning inference. CNNs trained on such a synthetic dataset allow for accurate human depth estimation and human part segmentation in real RGB images. The results and the new dataset open up new possibilities for advancing human analysis using inexpensive and large-scale synthetic data.

The SURREAL dataset differs from previous approaches for rendering large-scale synthetic images by having a richer, per-pixel ground truth, thus allowing its use for training pixel-wise predictions and multi-task scenarios. In addition, the realism in the SURREAL synthetic images is better than previous approaches, thus resulting in a smaller gap between features learned from synthetic and real images. Moreover, SURREAL can be used to render video sequences which can be used for temporal modeling.

The SURREAL dataset presents several additional differences when compared with existing synthetic datasets. SURREAL is a large-scale human dataset providing depth, part segmentation and flow ground truth for synthetic RGB frames. Other datasets are typically used either for taking RGB image as input and training only for 2D/3D pose, or for taking depth/infrared images as input and training for depth/ parts segmentation. The photo-realistic renderings of humans under large variations in shape, texture, viewpoint and pose that are represented by the SURREAL dataset can help solving pixel-wise human labeling tasks.

One goal of the image augmentation system is to use the described machine-learned understanding to estimate body shape from images without involving humans in the loop. As a canonical example, the system considers images depicting a particular human, for example, from that human's social networking site or other digital photograph or image collection. Of course, the method applies more generally to any images of the human whether acquired via the Internet or other means. The input images could be photographic images, depth images (such as laser scans, millimeter wave data, etc.), 3D data projected into a 2D plane, thermal images, 2D sensor data, video, or any combination thereof. Moreover, while the present disclosure refers to augmenting images of humans, those skilled in the art will appreciate that the disclosed technology may be applied to generate augmented images of any type of subject, whether or not the subject is human, is animate or is inanimate.

Artificial intelligence describes computerized systems that can perform tasks typically considered to require human intelligence. Here, the disclosed artificial intelligence systems can perform image augmentation that, without the disclosed technology, may otherwise require the skill and intelligence of a human graphical artist. The capability to learn is an important aspect of intelligence, as a system without this capability generally cannot become more intelligent from experience. Machine learning is a field of computer science that gives computers the ability to learn without being explicitly programmed, for example, enabling artificial intelligence systems to learn complex tasks or adapt to changing environments. The disclosed machine learning systems can learn to determine image parameters and/or human body parameters through being exposed to large volumes of labeled training data.

As an example, deep learning can be accomplished in part by fitting a model to data which may be accomplished by one or more CNNs. The CNNs are trained using examples consisting of pairs of sensor data (for example, photos, some of which may be pre-processed with methods such as cropping) and corresponding body shape (which may be determined by methods including hand measurements, clothing sizing information, human labeling of the sensor data or deriving shape data from other sensor data). In one approach, the system will use computer-generated body models to generate large training sets of images plus body shape pairs. Because the measured body shape data may be more accurate or reliable than the computer-generated data, the CNN can be trained using techniques that account for which data should be fit more closely.

Once the CNN(s) have been trained, new inputs of the same form as the training sensor data can be presented to the CNNs. The CNNs predict the corresponding body shape, including ratings, 3D body shape, measurements, volumes, clothing sizes, and other shape metrics. In some instantiations, some body shape metrics predicted by a CNN will be used to predict additional body shape metrics. This prediction may be completed using a series of one or more additional CNNs, or other methods including, but not limited to, linear regression. For example, in one instantiation a primary CNN can take images as input and output ratings, with a secondary CNN accepting ratings as input and producing statistical measures of body shape, followed by a linear transformation from the statistical measures to 3D body shape.

Although aspects of some embodiments described in the disclosure will focus, for the purpose of illustration, on particular examples of machine learning models, input images, and body shape metrics, the examples are illustrative only and are not intended to be limiting. In some embodiments, the techniques described herein may be applied to additional or alternative image data, for example, photographic images, depth images (such as laser scans, millimeter wave data, etc.), 3D data projected onto a 2D plane, thermal images, 2D sensor data, video, or any combination thereof. Various aspects of the disclosure will now be described with regard to certain examples and embodiments, which are intended to illustrate but not limit the disclosure.

Overview of Example Synthetic Training Data Generation

CNNs provide significant gains to problems with large amounts of training data. In the field of human analysis, recent datasets now gather a sufficient number of annotated images to train networks for 2D human pose estimation. Other tasks such as accurate estimation of human motion, depth and body-part segmentation are lagging behind as manual supervision for such problems at large scale is typically prohibitively expensive.

Images of humans have rich variation in poses, clothing, hair styles, body shapes, occlusions, viewpoints, motion blur and other factors. Many of these variations, however, can be synthesized using existing 3D motion capture ("MoCap") data and modern tools for realistic rendering. Provided sufficient realism, such an approach would be highly useful for many tasks as it can generate rich ground truth in terms of depth, motion, body-part segmentation and occlusions. Although synthetic data has been used for many years, realism has been limited.

The present disclosure addresses these limitations with SURREAL: a large-scale dataset with synthetically-generated but realistic images of humans. The synthetic images are rendered from 3D sequences of MoCap data. To ensure realism, the synthetic bodies are created using a Skinned Multi-Person Line ("SMPL") body model, whose parameters are fit by the Motion and Shape Capture ("MOSH") method given raw 3D MoCap marker data. Given a standard marker set, MOSH simultaneously estimates the marker locations on a proxy 3D body model, estimates the body shape, and recovers the articulated body pose. By allowing body shape to vary over time, MOSH is able to capture the non-rigid motion of soft tissue. The synthetization techniques randomly sample a large variety of viewpoints, clothing and lighting. In one example, a SURREAL dataset contains more than 6 million frames together with ground truth pose, depth maps, and segmentation masks.

Figure 1B:
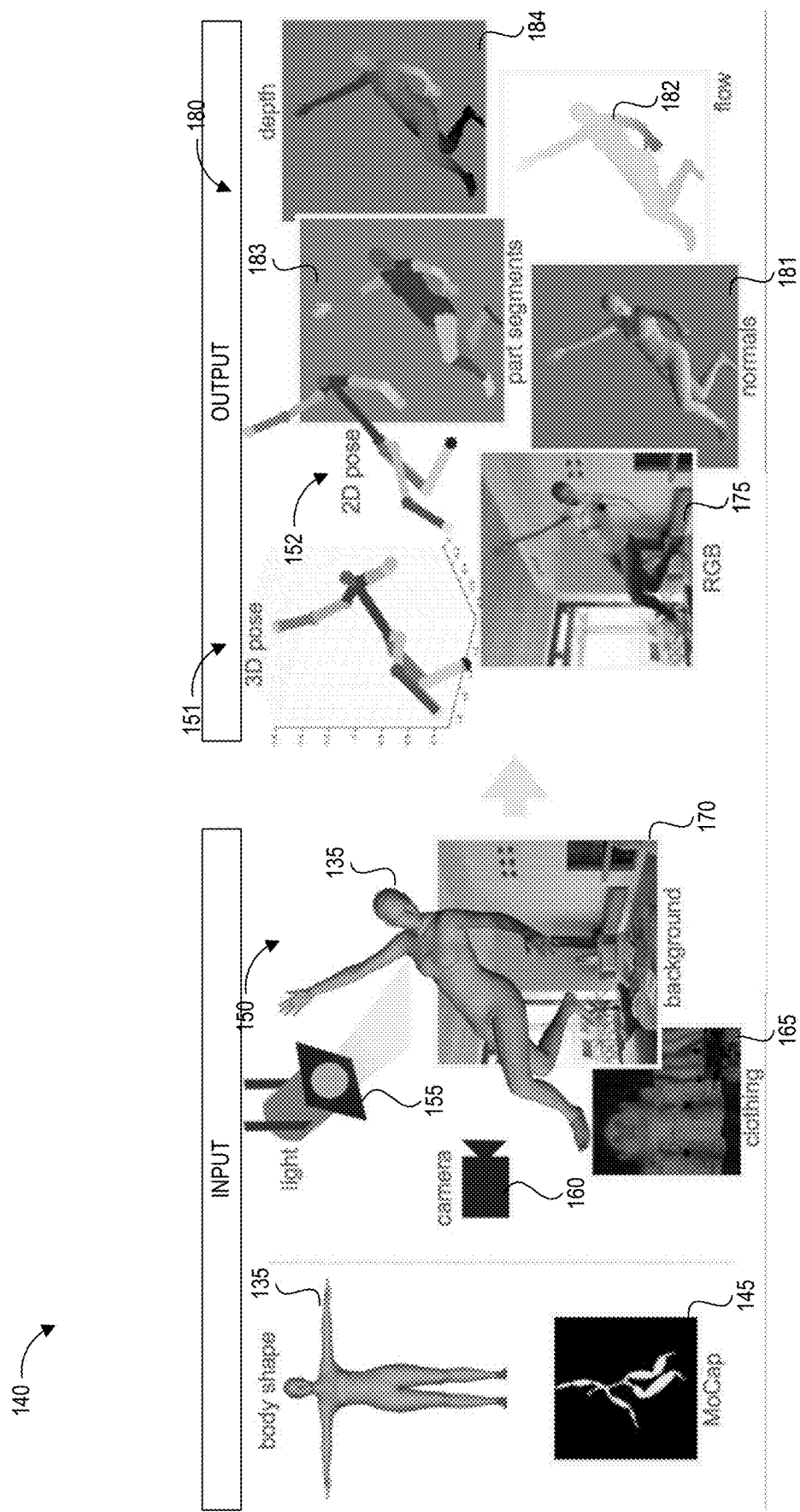
Figure 1C:
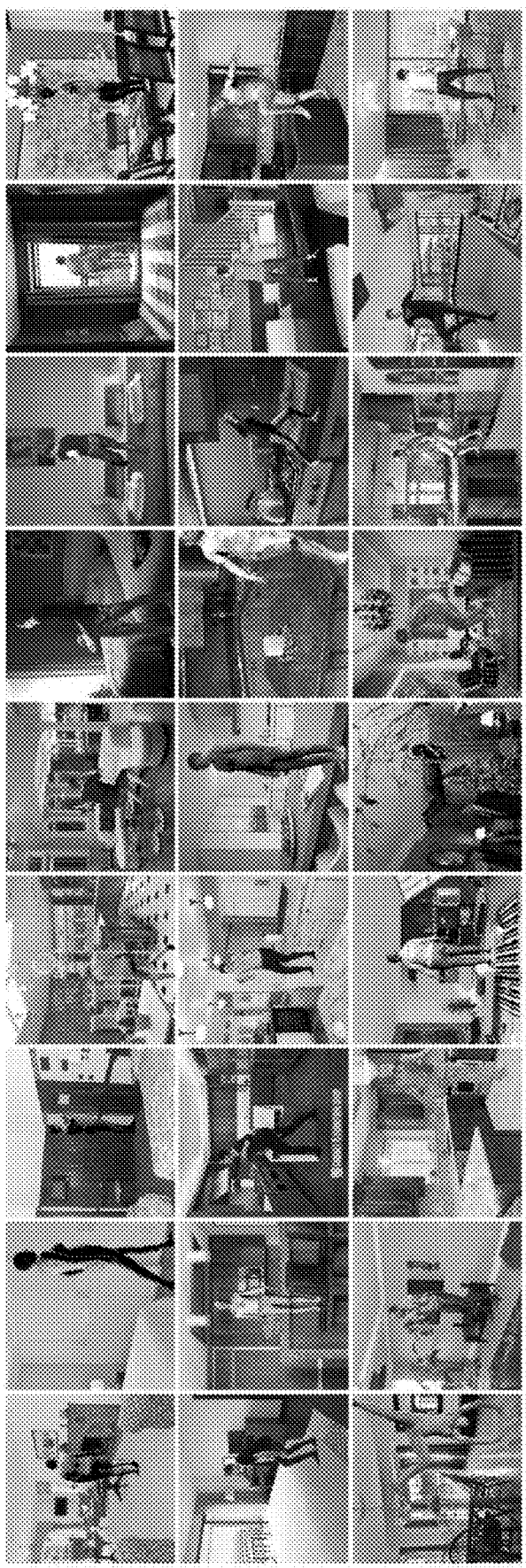

FIGS. 1A-1C depicts graphical examples of the disclosed machine learning systems that implement synthetic training data from a SURREAL database for predicting human body shape metrics. FIG. 1A depicts an example of the disclosed machine learning training process 100 that uses synthetic 110 training data to train a CNN 115 to predict ground truth images 120, 130. The disclosed synthetization techniques generate photo-realistic synthetic images 111 and their corresponding ground truth images 112, 113 for learning pixel-wise classification problems relating to human body part segmentation and depth estimation, as described in more detail with respect to FIG. 1B. The ground truth image 113 represents a segmented image that identifies pixels corresponding to different body parts of the body model, and the ground truth image 112 represents a depth map of the body model. Thus, the synthetic ground truth images 112, 113 depict representations of the shape of the body model. Similarly, the predicted ground truth images 120 represent depth maps of the body shape of the depicted human, and the ground truth images 130 represent segmented images that identifies pixels corresponding to different human body parts. Thus, the predicted ground truth images 120, 130 depict representations of the shape of the body of the human depicted in the corresponding input image 105.

FIG. 1A also depicts a testing step 125 relating to the predictions 120 in order to confirm that the CNN 115 trained only on synthetic data generalizes to real images sufficiently for both tasks. The CNN 115 is trained using the synthetic 110 training data, and thus its parameters represent encodings of patterns in the input synthetic training data (synthetic images 111) that enable it to produce the expected output (ground truth images 112, 113). Once trained, real images 105 are passed through the parameters of the trained CNN 115 to output predicted segmented images 120 of human body shape. These segmented images 120 are compared to labeled ground-truth images (not illustrated) of the input real images 105 in order to verify the accuracy of the CNN 115.

As discussed below with respect to the testing 125, the parameters of the CNN 115 when trained on synthetic training data (e.g., images representing computer-generated models of humans and not real, actual humans) generalize well to new input data depicting real humans. Beneficially, the techniques described herein for generating synthetic training data 110 provide this synthetic data with sufficient realism to enable the parameters of the CNN 115 to represent similar patterns to those present in images of real humans. These synthetic-training-data-rendering techniques include using body models that realistically represent soft tissue deformation in various poses, applying realistic texture maps to those body models, and positioning the textured body models in realistic scenes, as well as creating a synthetic training data set representing a sufficient variety of the body models, poses, textures, and scenes. As such, although the structure of the CNN 115 reflects training based on synthetic data depicting computer-generated body models, this structure is also able to make body shape predictions when provided with real images depicting actual humans. Beneficially, these techniques also enable such large, realistic, and diverse training data sets to be generated automatically (e.g., without requiring the human time and resources required for generating a similarly large and diverse training data set that depicts real humans).

In one example, the model generalizes reasonably well during testing 125, except when the input images include multiple humans close to each other and extreme viewpoints, which have not appeared during training. It is interesting to note that, in some examples, although lower body occlusions and cloth shapes are not present in synthetic training, the models perform accurately.

In one example, approximately 20% of the SURREAL dataset is used for evaluation of segmentation on synthetic images. These 20% of the images are not used for training, and instead are passed through a trained CNN 115 so that the results of the training can be evaluated. For segmentation, the intersection over union ("IOU") and pixel accuracy are 69.13% and 80.61%, respectively.

TABLE 1

| Training data | IOU | | Accuracy | |
| --- | --- | --- | --- | --- |
| | fg + bg | fg | fg + bg | fg |
| Real | 49.61 | 46.32 | 58.54 | 55.69 |
| Synth | 46.35 | 42.91 | 56.51 | 53.55 |
| Synth + Real | 57.07 | 54.30 | 67.72 | 65.53 |

Table 1 illustrates another example and summarizes the parts segmentation results on the Human3.6M dataset. The Human3.6M dataset is a collection of approximately 3.6 Million accurate 3D human poses acquired by recording the performance of 5 female and 6 male subjects under 4 different viewpoints. Table 1 reports both the mean over 14 human different body parts that define the disclosed image segmentation ("fg") and the mean together with the background class ("fg+bg"), where the background class refers to pixels corresponding to the image background. Table 1 shows a performance comparison between (i) the CNN 115 trained using real images instead of synthetic images (labeled "Real" in Table 1), (ii) the CNN 115 trained using synthetic images generated as described herein (labeled "Synth" in Table 1), and (iii) the CNN 115 pre-trained with synthetic images and then fine-tuned with real images (in this example, from Human3.6M) (labeled "Synth+Real" in Table 1), when each of these trained versions of the CNN was exposed to new input data.

In this example, training the CNN 115 on real images instead of synthetic images increases IOU by 3.4% and pixel accuracy by 2.14% compared to training the CNN 115 on synthetic images generated as described herein. This is expected because the training distribution generally matches the test distribution in terms of background, camera position and action categories (e.g., poses). Furthermore, the quantity of real data in the Human3.6M dataset is sufficient to perform CNN training. However, since there are few subjects available in the Human3.6M dataset (only 11 subjects total), the CNN 115 trained using only this data does not generalize to different clothing. In addition, as noted via the image segmentations that were output by the "Real" CNN 115, when the CNN 115 is trained on real data it learns about skin color rather than actual body parts. The pre-trained "Synth" CNN 115 performs reasonably well, even though the pose distribution in MoCap is quite different than that of Human3.6M.

When the CNN 115 is pre-trained with synthetic images and then fine-tuned with real images (in this example, real images from the Human3.6M dataset), the model predicts very accurate segmentations and outperforms the "Real" version of the CNN 115 by a large margin. Moreover, the "Synth+Real" CNN 115 is capable of distinguishing left and right most of the time on all four views since it has been trained with randomly sampled views.

In another example, the CNN 115 trained on the synthetic SURREAL data displayed an IOU of 48.11%, and a root mean squared error ("RMSE") of 2.44 when tested on real images from the Human3.6M dataset. RMSE was computed between the predicted quantized depth value (class) and the ground truth quantized depth values of the human-depicting pixels. To interpret the error in real world coordinates, it was multiplied it by a quantization constant (here, 45 mm). This synthetically-trained version of the CNN 115 outperformed a version of the CNN 115 that was trained on real images from the CMU MoCap dataset. This real-trained version of the CNN 115 displayed an IOU of 42.82% and RMSE: 2.57 when tested on real images from the Human3.6M dataset.

FIG. 1B depicts a pipeline 140 for the SURREAL rendering techniques for generating synthetic data. A 3D human body model 135 is posed using motion capture data 145 and an RGB image 175 is rendered using a background image 170, a texture map 185 on the body, lighting 155 and a virtual camera 160. These ingredients are randomly sampled to increase the diversity of the data. The synthetization engine (for example, synthetic training data generator 226 described below) generates RGB images 175 together with 2D poses 152, 3D poses 151, surface normal map 181, optical flow map 182, depth map 184, and body-part segmentation image 183 for the rendered human in the image 175. The optical flow map 182 is the pattern of apparent motion of objects, surfaces, and edges in a visual scene caused by the relative motion between an observer and a scene. The depth map 184 is an image that contains information relating to the distance of the surfaces of the human body from the virtual camera viewpoint 160.

With respect to the body model 135, these synthetic bodies are created using a SMPL body model. SMPL is a realistic articulated model of the body created from thousands of high-quality 3D scans, which decomposes body deformations into pose (kinematic deformations due to skeletal posture) and shape (body deformations intrinsic to a particular human that make them different from others). SMPL includes a multi-shape dataset representing a number of different male and female body shapes. SMPL deformations are modeled as a combination of linear blend skinning and linear blendshapes defined by principal components of body shape variation. In some embodiments, SMPL pose and shape parameters are converted to a triangulated mesh, and then texture and shading are applied and a background is added to generate the final RGB output.

In order to render varied, but realistic, body shapes for the body model 135, the SURREAL rendering techniques make use of the CAESAR dataset which was used to train SMPL. The CAESAR dataset is one of the largest commercially available scan databases, a full body 3-D laser scan database provided by the Civilian American European Surface Anthropometric Resource ("CAESAR") Survey. The CAESAR dataset represents anthropometric variability of 4,400 men and women aged 18-65 from U.S. and Canada (2,400 subjects) and several European countries (2,000 subjects). It also contains 40 traditional anthropometric measures and demographic information of each subject. To create a body shape, the SURREAL rendering techniques select one of the CAESAR subjects at random and approximate their shape with the first 10 SMPL shape principal components. For example, ten shape components explain more than 95% of the shape variance in CAESAR (at the resolution of the mesh) and produce quite realistic body shapes.

With respect to body pose 150, in order to generate images of humans in realistic poses, the SURREAL rendering techniques, in one example, take motion capture data from the Carnegie Mellon University ("CMU") MoCap database. CMU MoCap contains more than 2000 sequences of 23 high-level action categories, resulting in more than 10 hours of recorded 3D locations of body markers.

A human body model 135 with a random 3D pose 150, random shape and random texture is rendered from a random view-point for some random lighting and a random background image. The above description defines what "random" means in these cases. Since the data is synthetic, this technique also generates ground truth images including depth maps 184, optical flow 182, surface normal 181, human part segmentations 183 and joint locations (both 2D 152 and 3D 151). As a result, in one example, 6.5 million frames are grouped into 67 and 582 continuous image sequences are obtained.

It is often challenging to realistically and automatically retarget MoCap skeleton data to a new model. For this reason the SURREAL rendering techniques do not use the skeleton data but rather use MOSH to fit the SMPL parameters that best explain raw 3D Mo-Cap marker locations. This gives both the 3D shape of the subject and the articulated pose parameters of SMPL. To increase the diversity, the SURREAL rendering techniques replace the estimated 3D body shape with a set of randomly sampled body shapes.

Each CMU MoCap sequence may be rendered three times using different random parameters. Moreover, the sequences may be divided into clips of 100 frames with 30%, 50% and 70% overlaps for these three renderings. Every pose of the sequence may be rendered with consistent parameters (e.g., body shape, clothing, light, background etc.) within each clip.

With respect to the map of human texture 165, the SURREAL rendering techniques may use two types of real scans for the texture of body models. First, the SURREAL rendering techniques may extract SMPL texture maps from CAESAR scans, which come with a color texture per 3D point. These maps vary in skin color and person identities; however, their quality is often low due to the low resolution, uniform tight-fitting clothing, and visible markers placed on the face and the body. Anthropometric markers may be automatically removed from the texture images and the underlying regions inpainted. In digital image processing, inpainting (also known as image interpolation or video interpolation) refers to the application of sophisticated algorithms to replace lost or corrupted parts of the image data (mainly small regions or to remove small defects). To provide more variety, the SURREAL rendering techniques may extract a second set of textures obtained from 3D scans of subjects with normal clothing. The texture of real clothing substantially increases the realism of generated images, even though SMPL does not model 3D deformations of clothes.

To preserve the anonymity of subjects, the SURREAL rendering techniques can replace all faces in the texture maps by the average CAESAR face. The skin color of this average face is corrected to fit the face skin color of the original texture map. This corrected average face is blended smoothly with the original map, resulting in a realistic and anonymized body texture.

With respect to the lighting 155, the body model 135 is illuminated using spherical harmonics with nine coefficients. These coefficients are randomly sampled from a uniform distribution between −0:7 and +0:7, apart from the ambient illumination coefficient (which has a minimum value of 0:5) and the vertical illumination component, which is biased to encourage the illumination from above. For rendering engines that do not provide spherical harmonics illumination, a spherical harmonic shader for the body material can be implemented in Open Shading Language.

With respect to the camera 160, the projective camera has a resolution of 320 240, focal length of 60 mm and sensor size of 32 mm. To generate images of the body in a wide range of positions, the SURREAL rendering techniques take 100-frame MoCap sub-sequences and, in the first frame, render the body so that the center of the viewport points to the pelvis of the body, at a random distance (sampled from a normal distribution with 8 meters mean, 1 meter deviation) with a random yaw angle. The remainder of the sequence then effectively produces bodies in a range of locations relative to the static camera.

With respect to the background 170, the SURREAL rendering technique renders a human on top of a static background image. To ensure that the backgrounds are reasonably realistic and do not include other humans, the SURREAL rendering techniques can sample from a dataset that includes total of, e.g., 400 K, images from the categories kitchen, living room, bedroom and dining room.

With respect to the ground truth segmentation map 183, the SURREAL rendering techniques perform multiple rendering passes to generate different types of per-pixel ground truth. A material pass generates pixel-wise segmentation of rendered body parts, given different material indices assigned to different parts of the body model 135. A velocity pass, typically used to simulate motion blur, provides a render simulating optical flow 183. Depth and normal passes, used for emulating effects like fog, bokeh (e.g., the aesthetic quality of the blur produced in the out-of-focus parts of an image produced by a lens) or for performing shading, produce per-pixel depth maps 184 and normal maps 181. A final texture rendering pass overlays the shaded, textured body over the random background 170. Together with this data the SURREAL rendering techniques save camera and lighting parameters as well as the 2D/3D positions of body joints.

As described above, the Human3.6M dataset is a collection of 3.6 Million accurate 3D human poses acquired by recording the performance of 5 female and 6 male subjects under 4 different viewpoints. This dataset provides ground truth for 2D and 3D human poses. The SURREAL rendering techniques complement this ground truth and generate predicted body-part segmentation and depth maps for the humans depicted in Human3.6M. This technique uses MOSH to fit the SMPL body shape 135 and pose 150 to the raw MoCap marker data 145. This provides a good fit of the model to the shape and the pose of real bodies. Given the provided camera calibration, the SURREAL rendering techniques project models to images and then render the ground truth segmentation 183, depth 184, and 2D/3D joints as described above, while ensuring correspondence with real pixel values in the dataset. As MOSH provides almost perfect fits of the model, this data is considered to be "ground truth." The SURREAL rendering techniques use this ground truth for the baseline when training only on real data, and also for fine-tuning models pre-trained on synthetic data. For example, frames from the synthetic training set can be used for synthetic pre-training, with final CNN training accomplished using real images and their corresponding ground truth.

FIG. 1C depicts sample frames 190 from the SURREAL dataset. The sample frames illustrate the large variety of poses, body shapes, clothing, viewpoints and backgrounds in the SURREAL dataset.

Figure 1D:
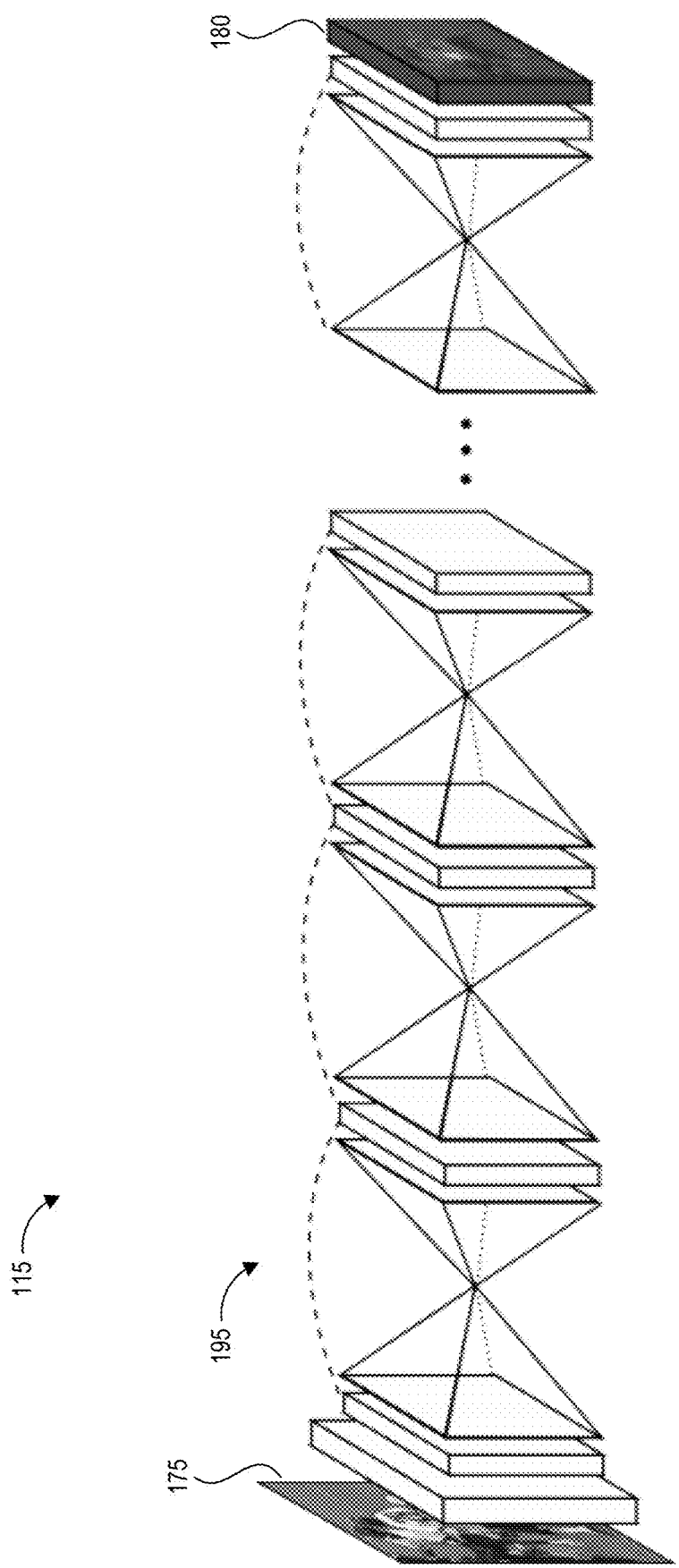

FIG. 1D depicts an example "hourglass" architecture for the CNN 115 that is suitable for the presently disclosed image analysis. Variations on this architecture, as well as other suitable CNNs can be used in other embodiments. The hourglass CNN 115 takes an image 175 as input and is trained to output the corresponding ground truth image 180. The hourglass CNN architecture includes a multiple stacked hourglass modules 195, that is, with multiple hourglass modules 195 positioned end-to-end. The hourglass CNN 115 captures and consolidates information across all scales of the image. The design is referred to as an "hourglass" based on the visualization of the steps of pooling and subsequent upsampling used to get the final output of the network. Like many convolutional approaches that produce pixel-wise outputs, the hourglass network pools down to a very low resolution, then upsamples and combines features across multiple resolutions.

The hourglass module 195 is set up as follows: convolutional and max pooling layers are used to process features down to a very low resolution. At each max pooling step, the network branches off and applies more convolutions at the original pre-pooled resolution. After reaching the lowest resolution, the network begins the top-down sequence of upsampling and combination of features across scales. To bring together information across two adjacent resolutions, the hourglass module 195 implements nearest neighbor upsampling of the lower resolution followed by an element-wise addition of the two sets of features. The topology of the hourglass is symmetric, so for every layer present on the way down there is a corresponding layer going up.

After reaching the output resolution of the network, two consecutive rounds of 1×1 convolutions are applied to produce the final network predictions. The output of the network is a set of heatmaps where for a given heatmap the network predicts the probability of a joint's presence at each and every pixel.

This CNN 115 involves several repetitions of contraction followed by expansion layers which have skip connections to implicitly model spatial relations from different resolutions that allows bottom-up and top-down structured prediction. The convolutional layers with residual connections and 8 hourglass modules are stacked on top of each other, each successive stack taking the previous stack's prediction as input.

In one example, the network input image 175 is a 3-channel RGB image of size 256 by 256 cropped and scaled to fit a human bounding box using the ground truth. The network output 180 for each stack has dimensions 64 by 64 by 15 in the case of segmentation (14 classes plus the background), and 64 by 64 by 20 for depth (19 depth classes plus the background). The CNN 115 uses cross-entropy loss defined on all pixels for both segmentation and depth. The final loss of the network is the sum over 8 stacks. The disclosed techniques can train for 50K iterations, for example, during the synthetic pre-training phase using an adaptive learning rate backpropagation with mini-batches of size 6 and a learning rate of 10 by 3. The data augmentation during training includes random rotations, scaling and color jittering.

This approach formulates the problem as pixel-wise classification task for both segmentation and depth. When addressing segmentation, each pixel is assigned to one of fourteen pre-defined human parts, namely head, torso, upper legs, lower legs, upper arms, lower arms, hands, feet (separately for right and left) or to the background class. Regarding the depth, the ground-truth depth maps are aligned on the z-axis by the depth of the pelvis joint, and then quantize depth values into 19 bins (9 behind and 9 in front of the pelvis). The quantization constant is set to 45 mm to roughly cover the depth extent of common human poses. The CNN 115 is trained to classify each pixel into one of the 19 depth bins or background. For example, first the disclosed techniques upsample feature maps of each class with bilinear interpolation by a factor of 4 to output the original resolution. Then, each pixel is assigned to the class for which the corresponding channel has the maximum activation.

Overview of Example Image Augmentation System

Figure 2:
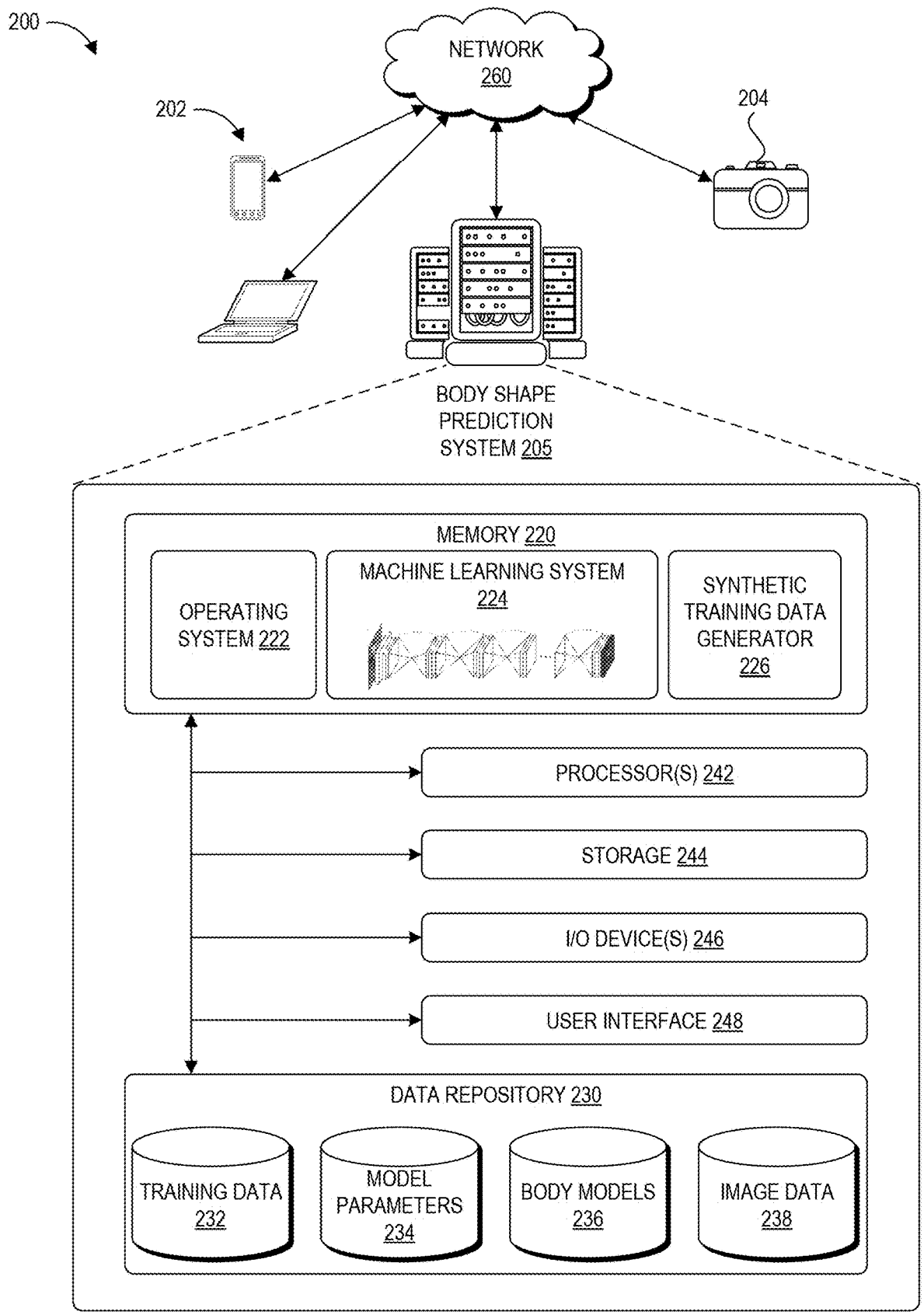
FIG. 2 is a block diagram of an illustrative body shape prediction system configured to implement the machine learning system of FIG. 1 for predicting human body shape metrics from input images.

FIG. 2 is a block diagram of an illustrative computing environment 200 of a body shape prediction system 205 configured to implement machine learning for predicting body shape from input images, for example, using a synthetically trained CNN 115 as described above with respect to FIGS. 1A-1D. As illustrated, the computing environment 200 includes the body shape prediction system 205, an image acquisition device 204, and user computing devices 202 configured to communicate data with one another via network 260. Though shown separately, in some embodiments the image acquisition device 204 may be integrated into a user computing device 202, for example as a smartphone or tablet with an integrated camera.

The body shape prediction system 205 includes at least one memory 220 and one or more processing units (or processor(s)) 242. The memory 220 may include more than one memory and may be distributed throughout the body shape prediction system 205. The memory 220 may store program instructions that are loadable and executable on the processor(s) 242 as well as data generated during the execution of these programs. Depending on the configuration and type of memory, the memory 220 may be volatile (such as random access memory ("RAM")) and/or non-volatile (such as read-only memory ("ROM"), flash memory, or other memory). In some examples, the memory 220 may include multiple different types of memory, such as static random access memory ("SRAM"), dynamic random access memory ("DRAM"), or ROM.

The memory 220 can store the program instructions as a number of modules that configure processor(s) 242 to perform the various functions described herein, for example operating system 222 for interacting with the computing environment 200, as well as machine learning system 224 and synthetic training data generator 226. The machine learning system 224 and synthetic training data generator 226 can be in direct communication with one another or distributed among computing devices within a networked computing system and in communication with each other. Components used for the architecture may depend at least in part upon the type of network and/or environment selected.

The synthetic training data generator 226 can generate synthetic training images and their corresponding ground truth(s) as described above with respect to FIGS. 1A-1D. For example, the synthetic training data generator 226 can identify a body model from a set of body models (e.g., the SMPL body model dataset), pose the body model, apply lighting and texture mapping to the posed body model, place it in front of a background image, and generate an image of this setup using a virtual camera at a predetermined "location" relative to the setup. The synthetic training data generator 226 can also generate ground truth images 180 for these synthetic images.

The machine learning system 224 can include one or more machine learning models for performing the described image analysis tasks. For example, the machine learning system 224 can include a first model trained to predict the shape of a human body depicted in an input image, referred to herein as the shape detection model. The shape detection model is trained to identify, from the input image data, the shape of the human body depicted in the image data. The shape detection model can be trained based on corresponding pairs of input image data (for example, entire images or segmented image data) and output 3D mappings of body surfaces. An example of the shape detection model is the CNN 115 described with respect to FIGS. 1A and 1D.

The shape detection model may be parametric such that the body shape is captured by a small number of parameters. It may also be a CNN, as described more below, or another suitable mathematical model trained from realistic real-world or synthetic data. This allows the system to locate the body in the input and provides high level understanding of the 3D shape of each body in the input.

By body shape, the present disclosure means one or both of subjective/qualitative and metrically accurate information about the body that can be used to size clothing, create avatars, measure health risks, etc. This may be in the form of a 3D "model" of the body, which can be represented by a mesh, point cloud, voxel grid, or other graphics representation. This model may be parametric such that the body shape is captured by a small number of parameters. Shape, however, can also mean things like standard tailoring measurements on the body, body type, or information related to clothing size. All of the above are referred to as "shape." A machine learning model as described herein can detect one or more of these shapes depending upon the shapes labeled in its training data.

The machine learning system 224 can include a second machine learning model trained to identify other body shape metrics based on the output of the shape detection model. For example, the second machine learning model can be a clothing size detection model that estimates the appropriate clothing size given the body shape predicted by the shape detection model. The clothing size detection model can be trained using pairs of body models (or a 2D image representation of the body model) and corresponding clothing sizes. Specifically, the clothing size detection model can be another CNN provided with an input of one or more of the ground truth images 180 output by the CNN 115 and trained to predict corresponding clothing sizes from this input. As such, the clothing size detection model leverages the output of the shape detection model in order to provide an automated prediction regarding the suitable clothing sizes for the depicted human. These sizes can be represented using suitable sizing metrics, for example "small," "medium," "large," etc., numerical sizes (e.g., dress size 6, pants size 30), or body measurement values (e.g., measurement of waistband and inseam).

During the inference stage (e.g., use of a trained machine learning model), these clothing sizes can be output as recommendations to the human depicted in a new input image. For example, an image depicting the human can be provided to the machine learning system 224. First, the image can be input into the CNN 115 to predict a ground truth image representing, for example, segmentation (e.g., body part identification), joint locations, optical flow, surface normals, and/or a depth map representing the body of the human. The predicted ground truth image(s) can be input into the clothing size detection model, which can output a predicted clothing size that is predicted to fit the body of the depicted human. This predicted clothing size can be used to provide a recommendation to the human, for example by pre-selecting the size from a list of available sizes in a user interface of an electronic catalog of items, or by identifying clothing items that are available in the predicted size for recommendation to the user.

As another example, the second machine learning model can be a health metric detection model that predicts various health metrics given the body shape predicted by the shape detection model. The health metric detection model can be trained using pairs of body models (or a 2D image representation of the body model) and corresponding health metrics. Specifically, the health metric detection model can be another CNN provided with an input of one or more of the ground truth images 180 output by the CNN 115 and trained to predict corresponding health metrics from this input. One example of a health metrics includes body mass index ("BMI"), which can be tracked over time using the disclosed machine learning system. Other examples of health metrics include indicators of body-shape related health conditions such as heart disease, high blood pressure, type 2 diabetes, gallstones, respiratory problems, anemia, osteoporosis, and the like. As such, the health metric detection model leverages the output of the shape detection model in order to provide an automated prediction regarding potential health issues for the depicted human. These health-related body metrics can be output to the user in an appropriate user interface, for example a user interface that presents information regarding a health condition. As another example, the user interface can present predicted risk percentages for certain identified health conditions, and may graphically represent a tracking of the predicted risk for the health condition over time.

The first and second machine learning models described herein can comprise artificial neural networks. Artificial neural networks are artificial in the sense that they are computational entities, inspired by biological neural networks but modified for implementation by computing devices. Artificial neural networks are used to model complex relationships between inputs and outputs or to find patterns in data, where the dependency between the inputs and the outputs cannot be easily ascertained. A neural network typically includes an input layer, one or more intermediate ("hidden") layers, and an output layer, with each layer including a number of nodes. A neural network is considered "deep" when it includes two or more hidden layers. The nodes in each layer connect to some or all nodes in the subsequent layer and the weights of these connections are typically learned from data during the training process, for example, through backpropagation in which the network parameters are tuned to produce expected outputs given corresponding inputs in labeled training data. Thus, an artificial neural network is an adaptive system that is configured to change its structure (e.g., the connection configuration and/or weights) based on information that flows through the network during training, and the weights of the hidden layers can be considered as an encoding of meaningful patterns in the data.

Specifically, the body shape prediction models described herein can comprise CNNs. A CNN is a type of artificial neural network, and like the artificial neural network described above, a CNN is made up of nodes and has learnable weights. However, the layers of a CNN can have nodes arranged in three dimensions: width, height, and depth, corresponding to the 2×2 array of pixel values in each video frame (e.g., the width and height) and to the number of video frames in the sequence (e.g., the depth). The nodes of a layer may only be locally connected to a small region of the width and height layer before it, called a receptive field. The hidden layer weights can take the form of a convolutional filter applied to the receptive field. In some embodiments, the convolutional filters can be two-dimensional, and thus, convolutions with the same filter can be repeated for each frame (or convolved transformation of an image) in the input volume or for designated subset of the frames. In other embodiments, the convolutional filters can be three-dimensional and thus extend through the full depth of nodes of the input volume. The nodes in each convolutional layer of a CNN can share weights such that the convolutional filter of a given layer is replicated across the entire width and height of the input volume (e.g., across an entire frame), reducing the overall number of trainable weights and increasing applicability of the CNN to data sets outside of the training data. Values of a layer may be pooled to reduce the number of computations in a subsequent layer (e.g., values representing certain pixels may be passed forward while others are discarded), and further along the depth of the CNN pool masks may reintroduce any discarded values to return the number of data points to the previous size. A number of layers, optionally with some being fully connected, can be stacked to form the CNN architecture.

During training, the CNN can be exposed to pairs in its training data and can modify its parameters to be able to predict the output of a pair when provided with the input. Examples of the "pairs" in the training data disclosed herein are pairs in the sense of 2-tuples. A 2-tuple can include an input image and the corresponding body shape, an input image and the corresponding body height, an input body shape and corresponding clothing size, or other suitable 2-tuples. These can be thought of as a "cause" and an "effect;" each one teaches the CNN something like "if you see a pixel pattern like this, return a body shape like this," or "if you see a pixel pattern like this, return a clothing size like this."

To illustrate, consider a CNN trained to predict the height of a human depicted in an input image. During training, the CNN would be exposed to thousands of images and thousands of corresponding heights as 2-tuples, e.g., (image of human 1, height of human 1), (image of human 2, height of human 2), (image of human 3, height of human 3), and so forth. For a given training set, each 2-tuple has the same type of information as the other 2-tuples in the training set. The goal is to train a machine learning model that takes the left side of each pair and returns the right side. Given the above example, the training would be creating a CNN that takes images and returns height. If the system replaced height with shirt size in the training data, the result would be a machine learning model that takes input images and predicts shirt size. As another example, to train a CNN that takes images as input and predicts the 3D shape of the human in the, the system would process pairs of the form (image of a human, 3D shape of the human).

Training a CNN can involve thousands of these 2-tuples, possibly many thousands. Thus, the training step can be slow and require very powerful computers, for example requiring hours to days to run on a powerful workstation with a large graphics processing unit ("GPU"). The output of the learning process is an artifact called a "network" having parameters that encapsulate what the CNN "knows" about how the inputs (e.g., images) relate to the outputs (e.g., 3D shape, or height). This network is then serialized to disk and stored for use in the predictions.

The use of the trained CNN starts with a serialized network and loads it into memory. An input (e.g., an image of a human) is then presented to the network, which responds with an output of the type it was trained to produce. This is a fast step that can be run on a relatively small device, like a regular computer or a smartphone 202. In some cases, this step is performed right on the smartphone or other portable computing device 202. In other cases, the device 202 sends the input up to a server such as the body shape prediction system 205 over a communication network 260 where the network is already loaded and waiting. The network then transmits the output back to the device 202. The output prediction can include one or more details associated with body shape such as textual descriptions, 3D body shape, measurements, volumes, clothing sizes, body parts sizes, and/or any other shape metrics.

Training a CNN may require a relatively large amount of training data compared to other methods. It can be difficult to acquire enough data. In order to deal with this lack of data, it is often useful to use a smaller amount of trustworthy, but hard to acquire data combined with a larger amount of less trustworthy, but easier to acquire data. For example, the system might have 1,000 images combined with laser scans of real humans, but could synthesize 100,000 computer generated images and synthetic body shapes to go with them, as described above with respect to FIGS. 1A-1D. A CNN can be pre-trained using the synthetic data and then refined using the real data, or can be trained from both datasets simultaneously with instructions to weight learning from the real data more heavily or vice versa. Similarly, the system could take an existing CNN and use it to produce a large amount of training data which could be combined with a small amount of carefully curated data to make sure it stays on target. This would allow the disclosed techniques to train a CNN based on whatever information the system can get at first and then go out into the real world and gather many thousands of real images for training a subsequent generation of CNN, allowing the new CNN to learn to generalize to things like backgrounds and clothing combinations that were not able to be presented in the first version.

Sometimes it is useful to train several CNNs that are chained together in a pipeline. For example, a CNN can take an existing image and predict a body shape. A training pipeline can start by gathering data where real humans commented on images (providing body-shape related comments like "tall," "short," "wide shoulders," etc.). A linear predictor can be used to go from the comments that several humans made on the image to a statistical representation of body shape, then another linear predictor can be used to go from the statistical representation to 3D body shape. With enough data, one can start training a CNN to replace the middle step, going from the lists of words (referred to as "ratings") to the statistical representation of body shape. Meanwhile, the process can gather enough data to train a separate CNN to replace the first step, going from images to ratings. This provides the image to rating, to statistical measure of body shape, to 3D shape pipeline. Subsequently, the process could go on train yet another CNN to replace the two CNNs initially used and go straight from images to the statistical measure of body shape. However, having the gap between the two CNNs is useful for debugging purposes, in that it may be hard to interpret the internal state of a CNN, but one can look at the intermediate result and say "at least the first step is behaving as expected, so the problem must be in the second step." Additionally, it is useful to have several small CNNs that can be combined in different ways, rather than having to retrain an entire CNN when a different output is desired (remembering that training a CNN can be a time consuming and computationally expensive proposition). This example also shows why it is mentioned that some steps in a pipeline might not be CNNs—the conversion from the statistical measure of body shape to 3D body shape may not, in some instances, benefit from being implemented using a CNN; the relationship between the two is typically linear by construction. Similarly, at the front end of the pipeline it can be beneficial to crop the images to just include the subject, so that the framing is consistent (this makes the problem simpler for the CNN, so it winds up needing somewhat less training data); cropping is another step that is typically less likely to benefit from using a CNN. With this approach, the end result is a pipeline chaining together several CNNs with a few non-CNN steps.

Two kinds of body shape information that have been described herein—the information in the training data that is paired with the sensor data; and the information that the CNN outputs. These two types of data are typically the same. If the CNN is trained on images plus 3D body shape, then if it is queried with a new image, the CNN will reply with a 3D body shape.

Referring again to FIG. 2A, the processor 242 may include one or more general purpose computers, dedicated microprocessors, graphics processors, or other processing devices capable of communicating electronic information. Examples of the processor 242 include one or more application-specific integrated circuits ("ASICs") (e.g., processors designed specifically for machine learning training and/or inference), graphical processing units ("GPUs"), field programmable gate arrays ("FPGAs"), graphics processing units ("GPUs"), digital signal processors ("DSPs") and any other suitable specific or general purpose processors. The processor 242 may be implemented as appropriate in hardware, firmware, or combinations thereof with computer-executable instructions and/or software. Computer-executable instructions and software may include computer-executable or machine-executable instructions written in any suitable programming language to perform the various functions described.

In some examples, the body shape prediction system 205 may also include additional storage 244, which may include removable storage and/or non-removable storage. The additional storage 244 may include, but is not limited to, magnetic storage, optical disks, and/or solid-state storage. The disk drives and their associated computer-readable media may provide non-volatile storage of computer-readable instructions, data structures, program modules, and other data for the computing devices. The memory 220 and the additional storage 244, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, and components, may refer to programming modules executed by computing systems (e.g., processors) that are part of the architecture.

The body shape prediction system 205 may also include input/output ("I/O") device(s) and/or ports 246, such as for enabling connection with a keyboard, a mouse, a pen, a voice input device, a touch input device, a display, speakers, a printer, or other I/O device. The body shape prediction system 205 may also include a user interface 248. The user interface 248 may be utilized by a user to access portions of the computing environment 200. In some examples, the user interface 248 may include a graphical user interface, web-based applications, programmatic interfaces such as application programming interfaces ("APIs"), or other user interface configurations. The user interface 248 can include displays of the feedback provision user interfaces described herein. In some embodiments, the I/O device(s) and/or ports 246 and user interface 248 can be part of a user computing device accessing the body shape prediction system 205 via network 260.

The body shape prediction system 205 may also include a data store 230. In some examples, the data store 230 includes one or more data stores, databases, data structures, or the like for storing and/or retaining information associated with the computing system 200. Thus, the data store 230 may include data structures, such as the training data repository 232, model parameters data repository 234, image augmentation rules 236, and image data 238. Data repositories can include a single database or multiple distinct databases, and may be stored using a single electronic storage device or multiple distinct electronic storage devices.

As described above, the machine learning system 224 may include a number of machine learning models that perform different tasks for recognizing humans and their shapes in input image data. The machine learning system 224 can also include instructions for training these models in order to learn the parameters that enable the models to identify the desired features represented by input data. The training data repository 232 stores training data that can be used to learn these parameters, for example labeled pairs of input data and the corresponding or expected output. As described herein, this can include tuples of actual image and body shape data and/or synthetic images and body shape data.

The model parameters data repository 234 stores the parameters of machine learning models, including CNNs, trained as described herein. For example, the model parameters data repository 234 can store the finalized parameters of the shape detection model and any subsequent body metric detection models.

The body models data repository 236 stores a number of body models, for example SMPL body models, that can be used to "randomly" select the body model 135 as shown in FIG. 1B. The body models data repository 236 can be updated as new body models are generated, for example through training the SMPL model from input 3D scans.

The image data repository 238 may store data representing input images for analysis by the machine learning system 224. The image data repository 238 can also store data associated with the input images, for example data representing any segmented images output by the shape detection model and any identified 3D body models output by the shape detection model.

The body shape prediction system 205 can communicate over network 260 with the image capture device 204 and user devices 202. In some embodiments, the body shape prediction system 205 can be included in the image capture device 204 and/or user devices 202. The network 260 can include any appropriate network, including an intranet, the Internet, a cellular network, a local area network or any other such network or combination thereof. For example, network 260 may be a publicly accessible network of linked networks, possibly operated by various distinct parties, such as the Internet. In other embodiments, the network 260 may include a private network, personal area network, local area network, wide area network, cable network, satellite network, cellular telephone network, etc., or a combination thereof, some or all of which may or may not have access to and/or from the Internet.

Image capture device 204 includes optical components (e.g., one or more lenses, color filters) and an image sensor configured to capture image data. The image sensor can be a charge-coupled device ("CCD"), complementary metal oxide semiconductor sensor ("CMOS"), or any other image sensing device that receives light and generates image data in response to the received image. A sensor can have an array of photosensitive elements that produce raw values for image pixels. The image capture device 204 can also include an image signal processor configured to perform various processing operations on received raw image data to output a processed image. Examples of image processing operations include cropping, scaling (e.g., to a different resolution), image format conversion, image filtering (e.g., spatial image filtering), lens artifact or defect correction, demosaicing, etc. The image capture device 204 can also include a memory storing instructions for capturing and processing images and for storing any generated image data.

User devices 202 can include any network-equipped computing device, for example, desktop computers, laptops, smartphones, tablets, e-readers, gaming consoles, wearable devices, and the like. Users can access the body shape prediction system 205 to send image data to and receive image data from the body shape prediction system 205 via the network 260. The user devices 202 can be provided with augmented images via the network 260. In some embodiments, the components of the body shape prediction system 205 may be incorporated into the user devices 202. In some embodiments, the components of the image capture device 204 and the body shape prediction system 205 may be incorporated into the user devices 202.

Overview of Body Shape Prediction Process

Figure 3:
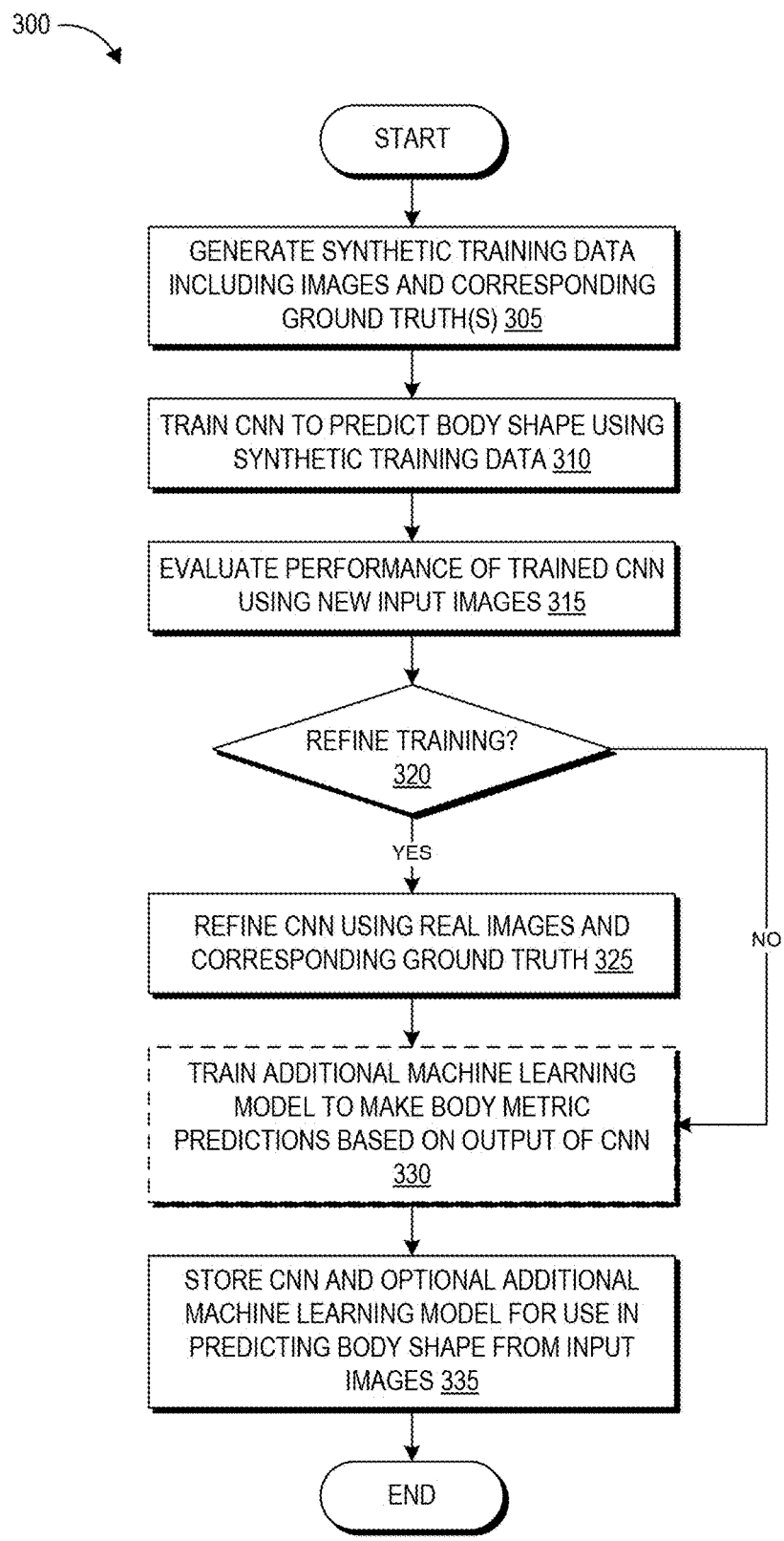
FIG. 3 is a flow diagram of an illustrative machine learning process for predicting human body shape metrics using the system of FIG. 2.

FIG. 3 is a flow diagram of an illustrative machine learning process 300 for training the machine learning system 224 using the computing environment 200 of FIG. 2A or another suitable computing system.

The process 300 may begin in response to an event, such as on a predetermined or dynamically determined schedule, on demand when initiated by a user, or in response to some other event. When the process 300 is initiated, a set of executable program instructions stored on one or more non-transitory computer-readable media (e.g., hard drive, flash memory, removable media, etc.) may be loaded into memory (e.g., random access memory or "RAM") of a server or other computing device of the computing environment 200. The executable instructions may then be executed by a hardware-based computer processor (e.g., a central processing unit or "CPU") of the computing device. In some embodiments, the process 300 or portions thereof may be implemented on multiple computing devices and/or multiple processors, serially or in parallel.

At block 305, the synthetic training data generator 226 can generate synthetic training data 110 including images 111, 175 and corresponding ground truth images 112, 113, 180. As described above with respect to FIGS. 1A-1D, the synthetic training data generator 226 can identify a body model 135 from a set of body models (e.g., the SMPL body model dataset), pose 150 the body model 135, apply virtual lighting 155 and texture mapping 165 to the posed body model, place it in front of a background image 170, and generate an image of this setup using a virtual camera 160 having predetermined parameters and positioned at a predetermined "location" relative to the setup. The synthetic training data generator 226 can also generate ground truth images 112, 113, 180 for these synthetic images 111, 175. The synthetic images 111, 175 and their corresponding ground truth images 112, 113, 180 can be stored as tuples of input and expected output for machine learning training.

At block 310, the machine learning system 224 can train CNN 115 to predict body shape using synthetic training data 110. The CNN 115 can be trained to generate the ground truth 180 and this can be used to identify the corresponding body model 135 that represents the depicted human.

At block 315, the machine learning system 224 can evaluate the performance of the trained CNN 115 through testing 125 using new input images 105. These may be synthetic images held out from the training or can be real test images 105. For example, the output 120 of the CNN 115 can be compared to empirical ground truth for the new input images 105 and evaluated for IOU and/or root mean squared error ("RMSE").

At block 320, the machine learning system 224 can determine whether to refine the training based on the result at block 315. For example, if the IOU and/or RMSE are above a desired threshold value, the machine learning system 224 can determine that the CNN 115 has been successfully trained and can move to optional block 330. If the IOU and/or RMSE are not above the desired threshold value, the machine learning system 224 can determine that the CNN 115 requires refinement and can move to block 325.

At block 325, the machine learning system 224 can refine the CNN 115 using real images and corresponding ground truth. This can serve to supplement the synthetic pre-training with refinement training using real images. Alternatively, if the testing at step 320 reveals that the CNN 115 does not generalize well to a type of data that can be synthetically produced (e.g., different viewpoints, body models, lighting conditions, or textures), the process 300 may instead loop back to block 305 to generate additional synthetic training data having the desired characteristics.

At optional block 330, the machine learning system 224 can train an additional machine learning model to make body metric predictions based on output of the CNN 115. As described above, this second machine learning model can be trained to predict body metrics including clothing size and various health-related metrics.

Once training is complete, at block 335 the machine learning system 224 can store the CNN 115 and optionally the additional machine learning model (e.g., using model parameters data repository 234) as a trained version of the machine learning system 224. This can be accessed for use in predicting body shape from input images 335. For example, a new input image can be provided to the CNN 115 to output a predicted body model that corresponds to the body shape of the depicted human. In some embodiments, this body model can be provided to the second machine learning model to output additional body metric data, for example a suitable clothing size or health-related prediction. Clothing size can refer to the size of articles of clothing (e.g., pants, dresses, shirts, hats, shoes, etc.) and other fitted wearable items or accessories.

Body Model Examples

FIGS. 4A-4D depict examples of body shape related data that can be output by a shape detection model as described herein. The body shape related data can additionally or alternatively be used to generate synthetic training data for training a body-shape predicting CNN as described herein, for example the body model 135 and texture map 165 of FIG. 1B.

Figure 4A:
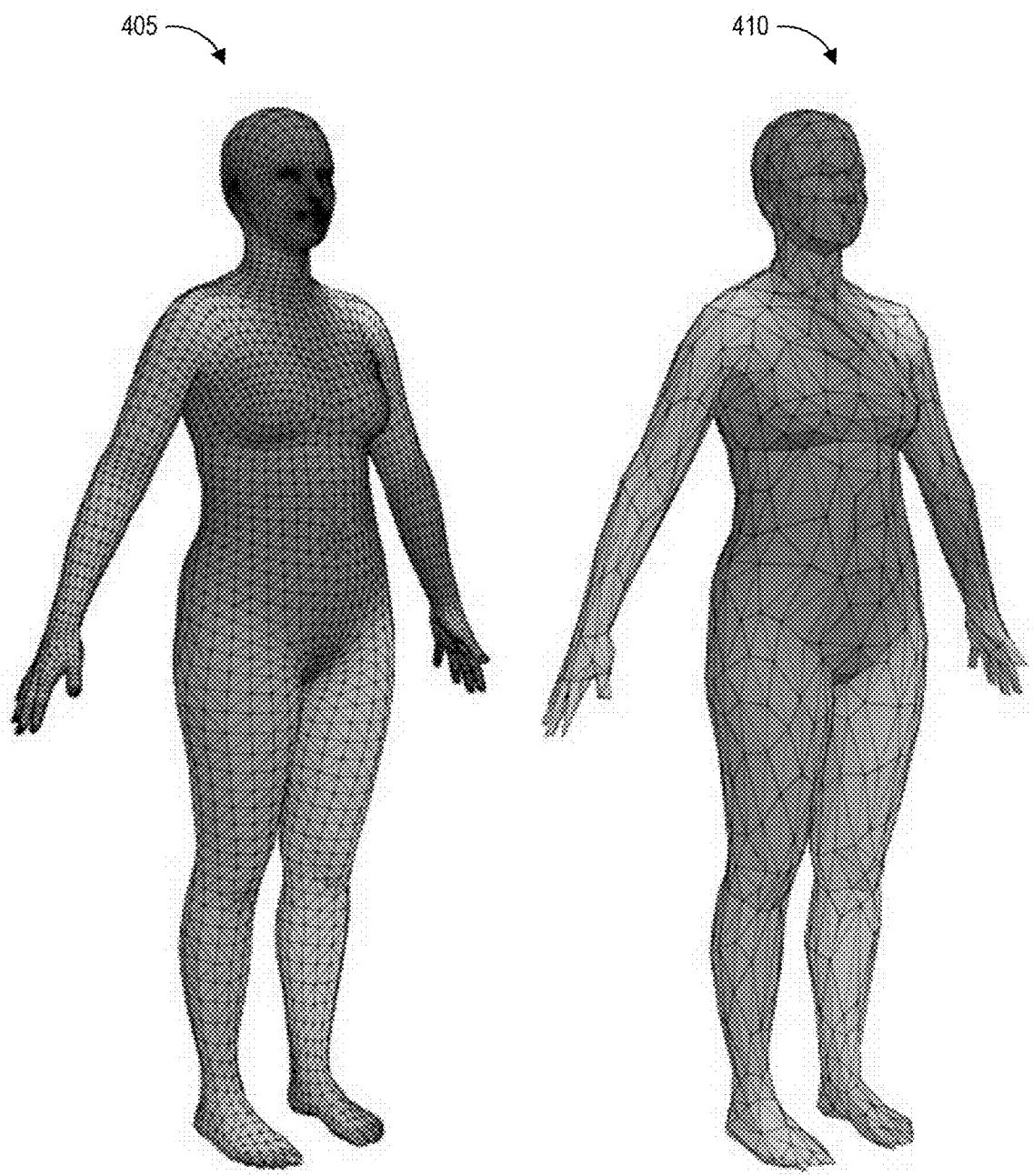
FIGS. 4A-4D depict examples of body shape related data that can be output by a body shape detection model as described herein

FIG. 4A depicts two examples of three-dimensional representations of a typical female shape. The first representation 405 is at a resolution of 6890 vertices and the second representation 410 is at a resolution of 863 vertices. The various shades of grayscale illustrate the segmentation of the body into parts and the blend weights. These examples are provided to illustrate and not intended to limit the disclosed three-dimensional body representation to a particular number of vertices.

Figure 4B:
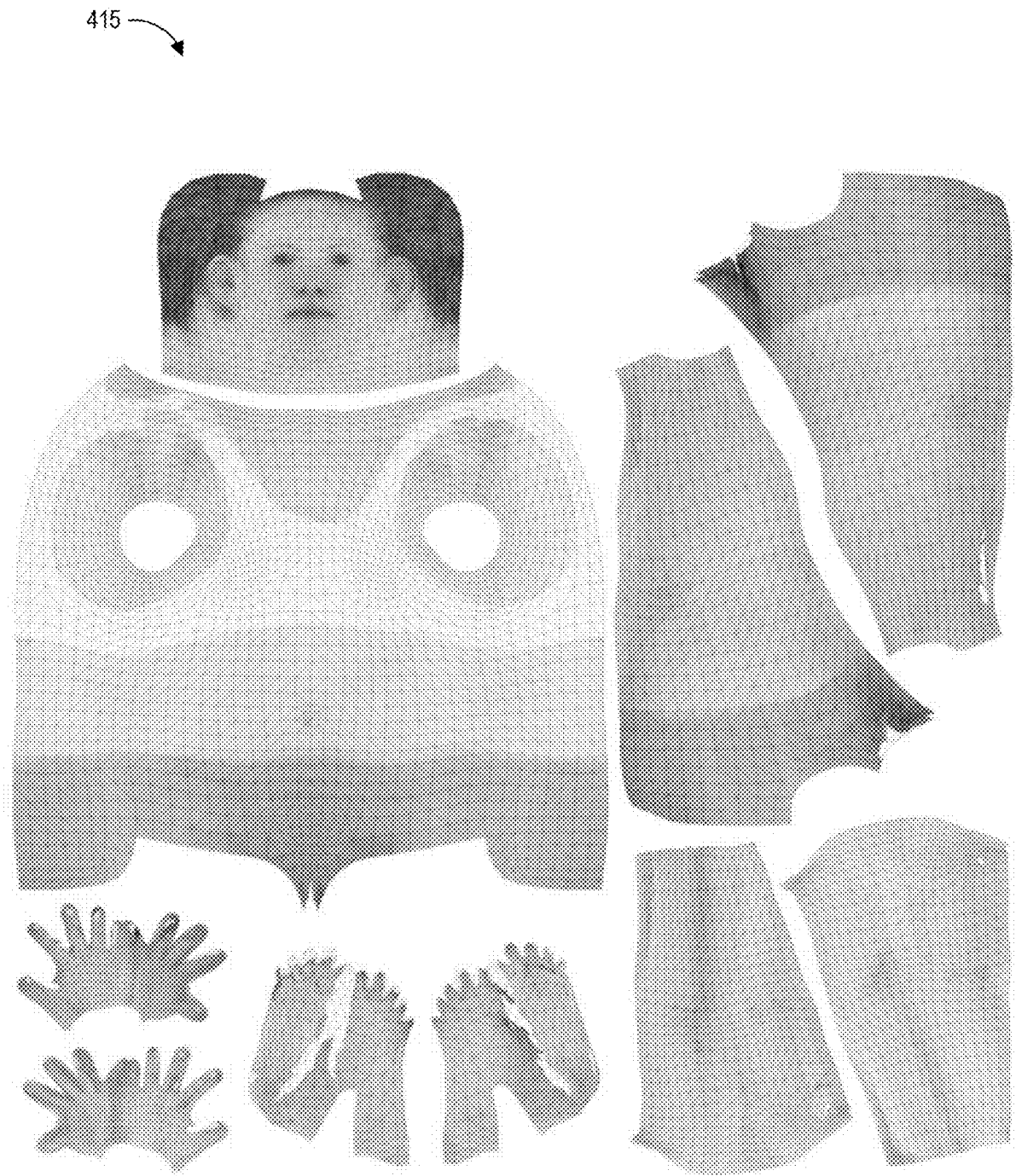

FIG. 4B depicts a high resolution texture map 415 of the exterior texture of a human female that can be modeled using the shape of FIG. 4A. As illustrated, the texture map represents details of the clothing, skin, and hair of the human. The texture map has been "unwrapped" such that the entire 3D surface of the human is shown in a 2D representation.

Figure 4C:

FIG. 4C depicts a high resolution displacement map 420. Displacement maps include grayscale values and displace (e.g., change the contours of) a 3D mesh to which they are applied. Here, the displacement map 420 is a representation of the actual contours of the human depicted by the texture map 415. The black areas are the lowest points and the white areas are the high points of the contours of the human, with the shades of grey representing points in between the highest and lowest points.

Figure 4D:
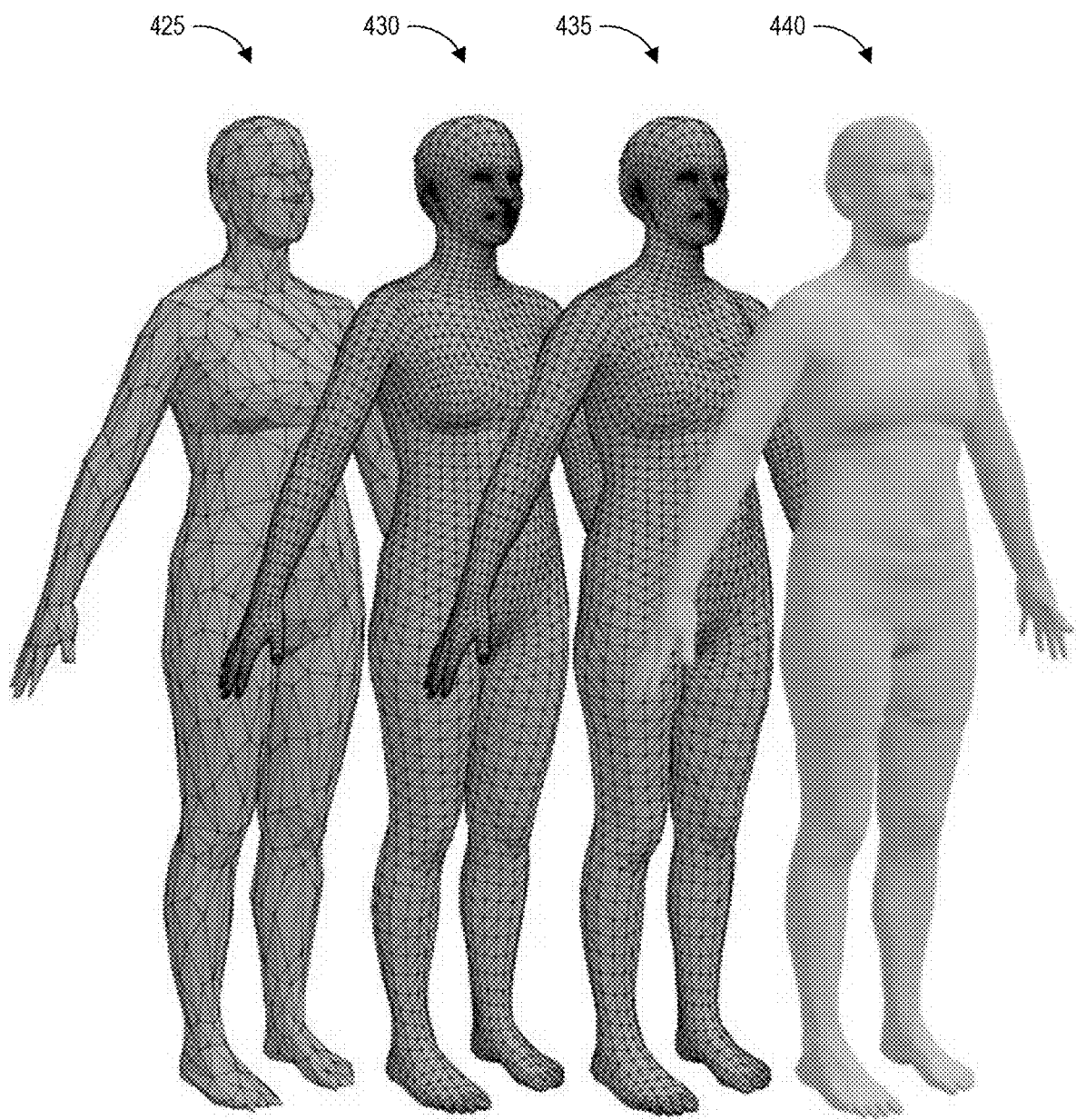

FIG. 4D depicts an estimated body shape 425 represented with 10 low-resolution shape basis vectors 420 and an estimated body shape 430 represented with 20 full-body high-resolution and 20 head basis vectors. FIG. 4D also depicts a personalized shape 435 representing the determined contours of the human depicted by the displacement map 420 used to displace the mesh of the estimated body shape 430. FIG. 4D also depicts a textured model 440 formed by the personalized shape 435 with the displacement map 420 applied.

In some examples, the data depicted in FIGS. 4A-4D can be generated from video sequences or laser scanning methods and used to train the shape detection model. The data depicted in FIGS. 4A-4D can be used as the expected output data for an input of a single, 2D image depicting the human. Thus, the disclosed techniques can train the shape detection model such that it can generate 3D body representations from a single image.

Body Shape Estimation Examples

As described above, one of the outputs of the CNN can be a 2D map 152 of joint locations in the input image. The below disclosure describes techniques that can be to fit a 3D body model to the identified joint locations.

Figure 5A:
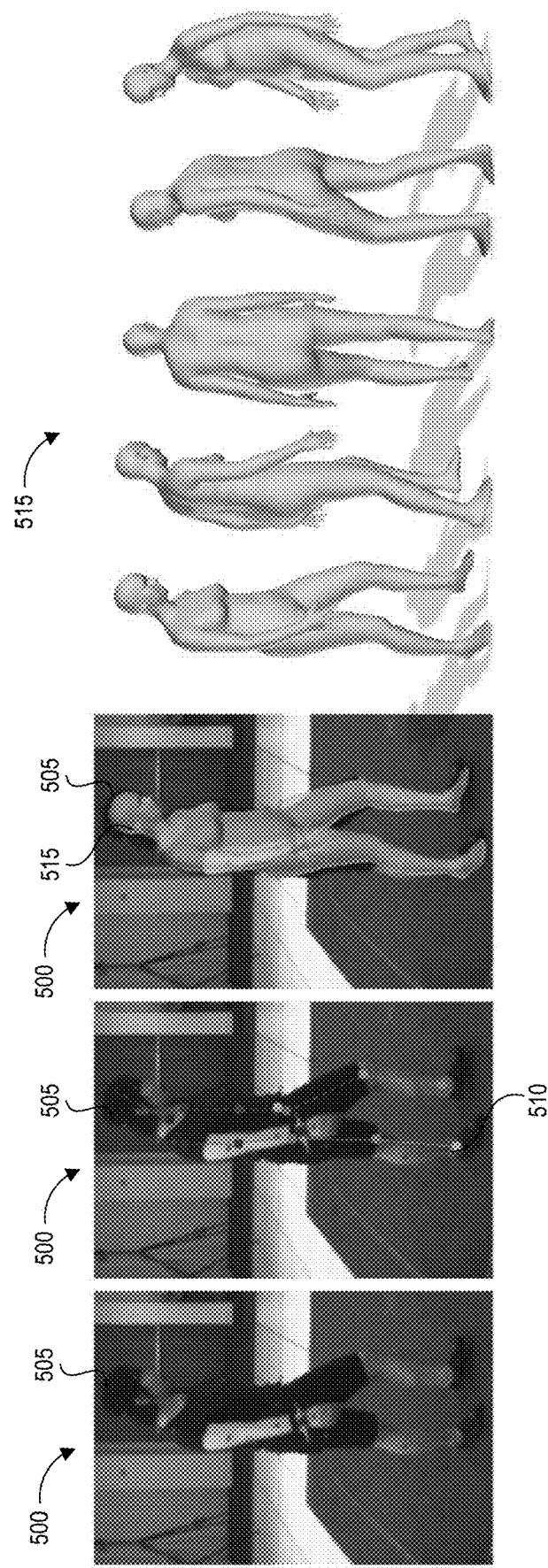
FIG. 5A illustrates an example of fitting body pose and shape to detected joint locations.

FIG. 5A depicts an overview of this approach. Given a single image 500 depicting a human 505, the machine learning system 224 uses the CNN 115 to predict 2D joint locations 510 (e.g., at block 335 of the process 300). In FIG. 5A, the darker shades of gray denote high confidence in the joint locations 510. The machine learning system 224 then fits a 3D body model 515 to the joint locations 510 to estimate 3D body shape and pose (e.g., also at block 335 of the process 300). FIG. 3A shows the fit body model 515 projected onto the image 500 over the human 505. This body model 515 is also shown from different viewpoints (rightmost poses shown in FIG. 5A).

For example, the machine learning system 224 can take a single input image 500, and use the CNN 115 to predict 2D body joints, $J_{est}$. For each 2D joint, the CNN 115 can provide a confidence value, $w_i$. At block 320, the s machine learning system 224 then fits a 3D body model, for example a body model in a SMPL or MOSH data set, such that the projected joints of the model minimize a robust weighted error term as described in more detail below with respect to equations (1) through (7). In this example the machine learning system 224 uses a SMPL model to take in the 2D image 500 and produce a posed 3D mesh 515.

The body model is defined as a function $M(\beta, \theta, \gamma)$, parameterized by shape $\beta$, pose $\theta$, and translation $\gamma$. The output of the function is a triangulated surface, M, with 6890 vertices in this example. Shape parameters are coefficients of a low-dimensional shape space, learned from a training set of thousands of registered scans. Here the machine learning system 224 uses one of three shape models: male, female, and gender-neutral. Since SMPL typically defines only male and female models, a gender-neutral model can be trained, for example, by using the male and female body shapes (e.g., 2000 of each) that were used to train the gendered SMPL models. If the gender is known, the machine learning system 224 uses the gender-appropriate model, if not it uses the gender-neutral body model.

The pose of the body is defined by a skeleton rig (e.g., with 23 joints), with pose parameters $\theta$ representing the axis-angle representation of the relative rotation between parts. $J(\beta)$ is the function that predicts 3D skeleton joint locations from body shape. In SMPL, joints are a sparse linear combination of surface vertices or, equivalently, a function of the shape coefficients. Joints can be put in arbitrary poses by applying a global rigid transformation. In the following, posed 3D joints are denoted as $R_\theta (J(\beta)_i)$ for joint i, where $R_\theta$ is the global rigid transformation induced by pose $\theta$. SMPL defines pose-dependent deformations; for the gender-neutral shape model, the presently disclosed techniques use the female deformations, which are general enough in practice. The SMPL model and DeepCut skeleton have slightly different joints. Thus, in one embodiment, DeepCut joints are associated with the most similar SMPL joints. A perspective camera model, defined by parameters K, is used to project SMPL joints onto the image 500.

Figure 5B:
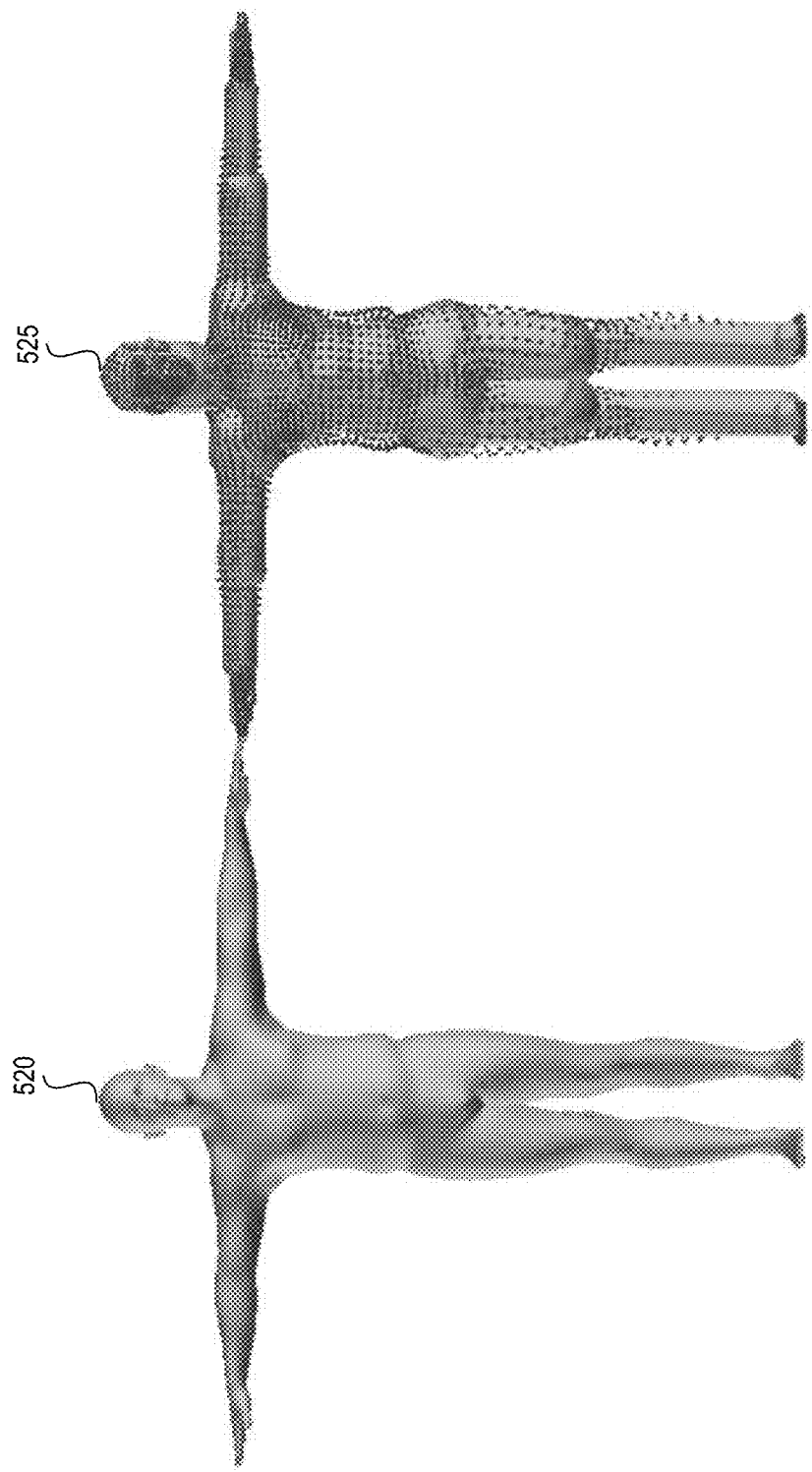
FIG. 5B illustrates an example of a body model representation usable in the fitting process used for FIG. 5A.

Some previous methods produce 3D poses that are suboptimal due to interpenetration between body parts. An advantage of the presently disclosed 3D shape model is that it can detect and prevent this. Computing interpenetration, however, is expensive for complex, non-convex surfaces like the body. The presently disclosed techniques thus approximate the body surface as a set of "capsules" each having a radius and an axis length. FIG. 5B shows the capsules used to approximate body models, showing an example body model 520 and that same model shape approximated by capsules 525.

The machine learning system 224 can train the shape fitting model as a regressor from model shape parameters to capsule parameters (axis length and radius). Specifically, the shape fitting model first fits 20 capsules, one per body part, excluding fingers and toes, to the body surface of the unposed or rest pose body model. Starting from capsules manually attached to body joints in the template, the shape fitting model first performs gradient-based optimization of their radii and axis lengths to minimize the bidirectional distance between capsules and body surface. The shape fitting model then learns a linear regressor from body shape coefficients, $\beta$, to the capsules' radii and axis lengths using cross-validated ridge regression. Once the regressor is trained, the procedure is iterated once more, initializing the capsules with the regressor output.

To fit the 3D pose and shape to the CNN-detected 2D joints, the shape fitting model minimizes an objective function that is the sum of five error terms: a joint-based data term, three pose priors, and a shape prior; that is $E(\beta, \theta) =$ $$E_J(\beta, \theta; K, J_{est}) + \lambda_\theta E_\theta(\theta) + \lambda_\alpha E_\alpha(\theta) + \lambda_{sp} E_{sp}(\theta; \beta) + \lambda_\beta E_\beta(\beta) \quad (1)$$

where K are camera parameters and $\lambda_\theta$, $\lambda_\alpha$, $\lambda_{sp}$, and $\lambda_\beta$ are scalar weights.

The joint-based data term penalizes the weighted 2D distance between estimated joints, $J_{est}$, and corresponding projected SMPL joints:

$$E_J(\beta, \theta; K, J_{est}) = \sum_{joint\ i} w_i \rho\left(\prod_K (R_\theta(J(\beta)_i)) - J_{est,i}\right) \quad (2)$$

where $\Pi_K$ is the projection from 3D to 2D induced by a camera with parameters K. The shape fitting model weights the contribution of each joint by the confidence of its estimate, $w_i$, provided by the CNN 115. For occluded joints, this value is usually low; pose in this case is driven by pose priors as defined by equation (3) below. A pose prior represents the reasonable or expectable limits on human joint motion ranges; imposing such a prior over computer-generated human model poses can serve to prevent the generation of invalid poses (e.g., poses that would not be achievable due to typical human joint dynamics). The shape fitting model can introduce a pose prior that penalizes elbows and knees that bend unnaturally, according to equation (3):

$$E_\alpha(\theta) = \sum_i \exp(\theta_i), \quad (3)$$

where i sums over pose parameters (rotations) corresponding to the bending of knees and elbows. The exponential strongly penalizes rotations violating natural constraints (e.g., elbow and knee hyperextending). Note that when the joint is not bent, $\theta_i$ is zero. Negative bending is natural and is not penalized heavily while positive bending is unnatural and is penalized more.

The pose prior can be trained using the Carnegie Mellon University ("CMU") PanopticStudio dataset that includes at least 480 VGA videos, 31 HD videos, 3D body pose, and calibration data relating to a number of humans that were recorded, alone or interacting together, inside of a dome. Given that poses vary significantly, it can be important to represent the multi-modal nature of the data, yet also keep the prior computationally tractable. To build a prior, the present disclosure use poses obtained by fitting the SMPL model to the CMU marker data using a MOSH technique. The shape fitting model then fits a mixture of Gaussians to approximately 1 million poses, spanning multiple (e.g., 100) subjects. Using the mixture model directly in this optimization framework can be problematic computationally because of the need to optimize the negative logarithm of a sum. Thus, the shape fitting model can approximate the sum in the mixture of Gaussians by a max operator:

$$E_\theta(\theta) \equiv -\log \sum_j \left(g_j \mathcal{N}\left(\theta; \mu_{\theta,j}, \sum_{\theta,j}\right)\right) \approx -\log\left(\max_j (cg_j \mathcal{N}\left(\theta; \mu_{\theta,j}, \sum_{\theta,j}\right))\right) \quad (4)$$

$$= \min_j (-\log(cg_j \mathcal{N}\left(\theta; \mu_{\theta,j}, \sum_{\theta,j}\right))) \quad (5)$$

where $g_j$ are the mixture model weights of N=8 Gaussians, and c a positive constant required by this solver implementation. Although $E_\theta$ is not differentiable at points where the mode with minimum energy changes, the shape fitting model can approximate its Jacobian by the Jacobian of the mode with minimum energy in the current optimization step. With respect to the Jacobian, if m=n, then f is a function from $\mathbb{R}^n$ to itself and the Jacobian matrix is a square matrix. Its determinant is known as the Jacobian determinant, occasionally referred to as "the Jacobian."

The shape fitting model also defines an interpenetration term that exploits the capsule approximation shown in FIG. 5B. The error term is related to the intersection volume between "incompatible" capsules (e.g., capsules that do not intersect in natural poses). Since the volume of capsule intersections is not simple to compute, the capsules are further simplified into spheres with centers $C(\theta,\beta)$ along the capsule axis and radius $r(\beta)$ corresponding to the capsule radius. The penalty term is inspired by the mixture of 3D Gaussians model, with a 3D isotropic Gaussian with $\sigma(\beta) = r(\beta)/3$ for each sphere, and the penalty defined as a scaled version of the integral of the product of Gaussians corresponding to "incompatible" parts:

$$E_{sp}(\theta; \beta) \sum_i \sum_{j \in I(i)} \exp\left(\frac{\|C_i(\theta, \beta) - C_j(\theta, \beta)\|^2}{\sigma_i^2(\beta) + \sigma_j^2(\beta)}\right) \quad (6)$$

where the summation is over all spheres i and I(i) are the spheres incompatible with i. The term penalizes, but does not strictly avoid, interpenetrations. As desired, however, this term is differentiable with respect to pose and shape. This term is typically not used in optimizing shape since this may bias the body shape to be thin to avoid interpenetration.

The shape fitting model can also use a shape prior $E_\beta(\beta)$, defined as $$E_\beta(\beta) = \beta^T \sum_\beta^{-1} \beta \quad (7)$$

where $$\sum_{\beta}^{-1}.$$

is a diagonal matrix with the squared singular values estimated via Principal Component Analysis from the shapes in the SMPL training set. The shape coefficients β are zero-mean by construction.

The present approach assumes that camera translation and body orientation are unknown, however, it requires that the camera focal length or its rough estimate is known. The camera translation is initialized (equivalently γ) by assuming that the human is standing parallel to the image plane. Specifically, this approach estimates the depth via the ratio of similar triangles, defined by the torso length of the mean SMPL shape and the predicted 2D joints. Since this assumption is not always true, this approach further refines this estimate by minimizing $E_J$ over the torso joints alone with respect to camera translation and body orientation. To do so, the shape fitting model keeps β fixed to the mean shape during this optimization. After estimating camera translation, the body model is fit by minimizing Eq. (1) above in a staged approach. The staged approach can involve, for example, starting with a high value for $\lambda_\theta$ and $\lambda_\beta$ and gradually decreasing them in the subsequent optimization stages in order to avoid local minima.

When the subject is captured in a side view, assessing in which direction the body is facing might be ambiguous. To address this, the shape detection model tries two initializations when the 2D distance between the CNN-estimated 2D shoulder joints is below a threshold: first with body orientation estimated as above and then with that orientation rotated by 180 degrees. Finally the shape fitting model picks the body model that fits with the lowest $E_J$ value.

The shape fitting model can minimize Eq. (1) using Powell's dogleg method. This is an algorithm proposed by Michael J. D. Powell for finding a local minimum of a function. Optimization for a single image can take less than 1 minute on a common desktop computer.

TERMINOLOGY

Implementations disclosed herein provide systems, methods and apparatus for training and using machine learning models. The disclosed training and prediction models can be implemented in machine learning systems or artificial intelligence systems, including image augmentation systems. As used herein, such systems include electronic memory storing computer-executable instructions for performing the described training and/or prediction operations and hardware processors that execute the instructions.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a graphics processing unit ("GPU"), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general purpose processor device can be a microprocessor, but in the alternative, the processor device can be a controller, microcontroller, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The terms "approximately," "about," and "substantially" as used herein represent an amount close to the stated amount that still performs a desired function or achieves a desired result. For example, in some embodiments, as the context may dictate, the terms "approximately," "about," and "substantially" may refer to an amount that is within less than or equal to 10% of a pre-defined threshold or amount. The term "generally" as used herein represents a value, amount, or characteristic that predominantly includes or tends toward a particular value, amount, or characteristic.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer implemented method comprising:
    receiving an image depicting a human;
    generating a plurality of first training data pairs, wherein each first training data pair includes (i) a synthetic image depicting a computer-generated body model positioned in front of an image background, wherein the computer-generated body model has a texture map applied thereto, and (ii) a synthetic ground truth image representing a shape of the computer-generated body model depicted in the synthetic image;
    training a first convolutional neural network ("CNN") to associate the synthetic ground truth image with the synthetic image included in the plurality of the first training data pairs;
    predicting a ground truth image from the image depicting the human using the trained first CNN, wherein the ground truth image represents a body shape of the human;
    predicting a body metric for the body shape of the human from the ground truth image using a second CNN; and
    generating content for output via a user interface, wherein the content is generated based at least partly on the body metric predicted using the second CNN.

2. The computer implemented method of claim 1, wherein the body metric comprises a clothing size, and wherein the content generated for output via the user interface comprises a recommendation of a clothing item available in the clothing size.

3. The computer implemented method of claim 1, wherein the body metric comprises a health condition, the wherein the content generated for output via the user interface comprises information regarding the health condition.

4. The computer implemented method of claim 1, wherein the first CNN is additionally trained based on one or more real images, wherein each of the real images depicts a real human.

5. The computer implemented method of claim 1, wherein the computer-generated body model comprises a three-dimensional ("3D") body model, the method further comprising, for each first training data pair of the plurality of first training data pairs, applying a texture map to the 3D body model.

6. The computer implemented method of claim 1, further comprising:
    accessing a plurality of second training data pairs, wherein each second training data pair includes (i) the synthetic ground truth image of a different one of the first training data pairs and (ii) the body metric corresponding to the synthetic ground truth image; and
    training the second CNN to associate the body metric with the synthetic ground truth image included in the plurality of the second training data pairs.

7. A non-transitory computer-readable medium including instructions that, when executed by one or more processors, cause the one or more processors to at least:
    receive an image depicting a human;
    generate a plurality of first training data pairs, wherein each first training data pair includes (i) a synthetic image depicting a computer-generated body model positioned in front of an image background, wherein the computer-generated body model has a texture map applied thereto, and (ii) a synthetic ground truth image representing a shape of the computer-generated body model depicted in the synthetic image;
    train a first convolutional neural network ("CNN") to associate the synthetic ground truth image with the synthetic image included in the plurality of the first training data pairs;
    predict a ground truth image from the image depicting the human using the trained first CNN, wherein the ground truth image represents a body shape of the human;
    predict a body metric for the body shape of the human from the ground truth image using a second CNN; and generate content for output via a user interface, wherein the content is generated based at least partly on the body metric predicted using the second CNN.

8. The non-transitory computer-readable medium of claim 7, wherein the body metric comprises a clothing size, and wherein the non-transitory computer-medium further includes instructions for generating the user interface to present a recommendation of a clothing item available in the clothing size.

9. The non-transitory computer-readable medium of claim 8, wherein the body metric comprises a health condition, and wherein the non-transitory computer-medium further includes instructions for generating the user interface to present information regarding the health condition.

10. The non-transitory computer-readable medium of claim 8, wherein the first CNN is additionally trained based on one or more real images, wherein each of the real images depicts a real human.

11. The non-transitory computer-readable medium of claim 7, wherein the computer-generated body model comprises a three-dimensional ("3D") body model, and wherein the non-transitory computer-medium further includes instructions for applying a texture map to the 3D body model for each first training data pair of the plurality of first training data pairs.

12. The non-transitory computer-readable medium of claim 7 further including instructions that, when executed by the one or more processors, further cause the one or more processors to at least:
access a plurality of second training data pairs, wherein each second training data pair includes (i) the synthetic ground truth image of a different one of the first training data pairs, and (ii) the body metric corresponding to the synthetic ground truth image; and
train the second CNN to associate the body metric with the synthetic ground truth image included in the plurality of the second training data pairs.

13. A system comprising:
a memory storing executable instructions; and
one or more processors in communication with the memory, the one or more processors programmed by the executable instructions to at least:
generate a plurality of first training data pairs, wherein each first training data pair includes (i) a synthetic image depicting a three-dimensional ("3D") body model and (ii) a synthetic ground truth image representing a shape of the 3D body model depicted in the synthetic image;
train a first convolutional neural network ("CNN") to associate the synthetic ground truth image with the synthetic image included in the plurality of the first training data pairs;
predict a ground truth image from an image depicting a human using the trained first CNN, wherein the ground truth image represents a body shape of the human;
predict a body metric for the body shape of the human from the ground truth image using a second CNN; and
generate content for output via a user interface, wherein the content is generated based at least partly on the body metric predicted using the second CNN.

14. The system of claim 13, wherein the 3D body model has a texture map applied thereto.

15. The system of claim 13, wherein the body metric comprises clothing size, and wherein the one or more processors are further programmed to at least generate the user interface to present a recommendation of a clothing item available in the clothing size.

16. The system of claim 13, wherein the body metric comprises a health condition, and wherein the one or more processors are further programmed to at least generate the user interface to present information regarding the health condition.

17. The system of claim 16, wherein the one or more processors are further programmed to at least:
determine that the first CNN is not performing sufficiently;
access a plurality of training data pairs, wherein each training data pair includes (i) a real image depicting a real human, and (ii) a real ground truth image corresponding to the real image and representing a body shape of the real human; and
with each training data pair of the plurality of training data pairs, refine the first CNN by further training the first CNN to predict the real ground truth image from the real image.

18. The system of claim 13, wherein the synthetic ground truth image includes at least one of: (i) a segmented image identifying pixels corresponding to specific body parts of the 3D body model, or (ii) a depth map representing at least one distance between a surface of the 3D body model and a virtual camera position from which the synthetic image is generated.

* * * * *